US010140635B2

(12) United States Patent
Kashiwagi et al.

(10) Patent No.: US 10,140,635 B2
(45) Date of Patent: *Nov. 27, 2018

(54) LOSS CALCULATION METHOD AND LOSS CALCULATING DEVICE

(71) Applicant: FUJITSU LIMITED, Kawasaki-shi, Kanagawa (JP)

(72) Inventors: Tetsuya Kashiwagi, Fukuoka (JP); Yuichi Matsufuji, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/944,349

(22) Filed: Apr. 3, 2018

(65) Prior Publication Data
US 2018/0225730 A1 Aug. 9, 2018

Related U.S. Application Data

(63) Continuation of application No. 14/331,663, filed on Jul. 15, 2014, now Pat. No. 9,965,781.

(30) Foreign Application Priority Data

Aug. 29, 2013 (JP) ................................. 2013-178653

(51) Int. Cl.
G01R 21/00 (2006.01)
G06Q 30/02 (2012.01)
G06Q 50/06 (2012.01)

(52) U.S. Cl.
CPC ......... *G06Q 30/0283* (2013.01); *G06Q 50/06* (2013.01)

(58) Field of Classification Search
CPC ........ G06Q 30/02; G06Q 50/06; G06Q 10/04; G06Q 10/00; H02J 3/00

USPC .......................................... 702/60, 62, 64, 65
See application file for complete search history.

(56) References Cited

U.S. PATENT DOCUMENTS

| 8,103,466 B2 | 1/2012 | Taft |
| 8,749,210 B1 | 6/2014 | Nakao et al. |
| 9,312,695 B2 | 4/2016 | Das et al. |
| 9,336,975 B2 | 5/2016 | Iizuka et al. |
| 9,965,781 B2 * | 5/2018 | Kashiwagi ............. G06Q 50/06 |

(Continued)

FOREIGN PATENT DOCUMENTS

| JP | 2006-217689 A | 8/2006 |
| JP | 2007-080260 A | 3/2007 |

(Continued)

OTHER PUBLICATIONS

USPTO Notice of Allowance and Notice of Allowability, dated Jan. 4, 2018, in parent U.S. Appl. No. 14/331,663 [pending].

(Continued)

*Primary Examiner* — An Do
(74) *Attorney, Agent, or Firm* — Fujitsu Patent Center

(57) ABSTRACT

A first calculating unit calculates a load current of each distribution facility based on a sending voltage in a power source facility and load information on power consumption facilities in an electrical circuit including the power source facility, the distribution facilities, and the power consumption facilities connected to one another to form the electrical circuit. A second calculating unit calculates the amount of power loss in each distribution facility based on the calculated load current of each distribution facility.

7 Claims, 27 Drawing Sheets

(56) References Cited

U.S. PATENT DOCUMENTS

2007/0050302 A1    3/2007  Cheim et al.
2012/0197454 A1    8/2012  Krok et al.

FOREIGN PATENT DOCUMENTS

| JP | 2010-009136 A | 1/2010 |
| JP | 2012-515521 A | 7/2012 |
| JP | 2012-157239 A | 8/2012 |
| JP | 2012-517791 A | 8/2012 |
| WO | 2010/083164 A2 | 7/2010 |
| WO | 2010/093345 A1 | 8/2010 |

OTHER PUBLICATIONS

USPTO Non-Final Rejection, dated Jun. 30, 2017, in parent U.S. Appl. No. 14/331,663 [pending].
USPTO Non-Final Rejection, dated Dec. 14, 2016, in parent U.S. Appl. No. 14/331,663 [pending].
Japanese Office Action dated Feb. 14, 2017 for corresponding Japanese Patent Application No. 2013-178653. with Partial English Translation, 5 pages.

\* cited by examiner

FIG.4

| POSITION ID | POSITION IDENTIFICATION | LATITUDE | LONGITUDE |
|---|---|---|---|
| SS0001 | SS | 502723016 | 128084866 |
| PO0001 | POLE | 502723021 | 128084176 |
| PO0002 | POLE | 502723031 | 128083227 |
| PO0003 | POLE | 502724066 | 128083262 |
| PO0004 | POLE | 502725091 | 128083296 |
| PO0005 | POLE | 502726033 | 128083331 |
| PO0006 | POLE | 502726840 | 128083382 |
| PO0007 | POLE | 502727844 | 128083430 |
| PO0008 | POLE | 502728620 | 128083503 |
| LL0001 | LOADL | 502728677 | 128083736 |
| PO0009 | POLE | 502729231 | 128083641 |
| PO0010 | POLE | 502729304 | 128084383 |
| PO0011 | POLE | 502729179 | 128084814 |
| LL0002 | LOADL | 502729402 | 128085012 |
| PO0012 | POLE | 502728879 | 128085361 |
| PO0013 | POLE | 502728620 | 128085900 |
| LL0003 | LOADL | 502729298 | 128086064 |
| LL0004 | LOADL | 502729174 | 128086288 |
| LL0005 | LOADL | 502729133 | 128085547 |
| PO0014 | POLE | 502725019 | 128082520 |
| LL0006 | LOADL | 502724661 | 128082339 |
| PO0015 | POLE | 502725112 | 128081757 |
| PO0016 | POLE | 502725122 | 128081244 |
| LL0007 | LOADL | 502724765 | 128081321 |
| LL0008 | LOADL | 502724744 | 128081718 |

FIG.5

| FACILITY ID | POSITION ID | TYPE | ATTRIBUTE INFORMATION |
|---|---|---|---|
| PO0001 P1 | PO0001 | POLE | ... |
| PO0001 01 | PO0001 | SW | ... |
| PO0002 P1 | PO0002 | POLE | ... |
| PO0003 P1 | PO0003 | POLE | ... |
| PO0004 P1 | PO0004 | POLE | ... |
| PO0004 01 | PO0004 | SW | ... |
| PO0005 P1 | PO0005 | POLE | ... |
| PO0006 P1 | PO0006 | POLE | ... |
| PO0007 P1 | PO0007 | POLE | ... |
| PO0007 01 | PO0007 | BANK | RESISTANCE (36800 Ω), REACTANCE (31300 Ω), VOLTAGE RATIO 1 |
| PO0008 P1 | PO0008 | POLE | ... |
| LL0001 01 | LL0001 | LOADL | ... |
| PO0009 P1 | PO0009 | POLE | ... |
| PO0009 01 | PO0009 | SW | ... |
| PO0010 P1 | PO0010 | POLE | ... |
| PO0011 P1 | PO0011 | POLE | ... |
| LL0002 01 | LL0002 | LOADL | ... |
| PO0012 P1 | PO0012 | POLE | ... |
| PO0012 01 | PO0012 | BANK | RESISTANCE (36800 Ω), REACTANCE (31300 Ω), VOLTAGE RATIO 2 |
| PO0013 P1 | PO0013 | POLE | ... |
| LL0003 01 | LL0003 | LOADL | ... |
| LL0004 01 | LL0004 | LOADL | ... |
| LL0005 01 | LL0005 | LOADL | ... |
| PO0014 P1 | PO0014 | POLE | ... |
| LL0006 01 | LL0006 | LOADL | ... |
| PO0015 P1 | PO0015 | POLE | ... |
| PO0015 01 | PO0015 | BANK | RESISTANCE (36800 Ω), REACTANCE (31300 Ω), VOLTAGE RATIO 3 |
| PO0016 P1 | PO0016 | POLE | ... |
| LL0007 01 | LL0007 | LOADL | ... |
| LL0008 01 | LL0008 | LOADL | ... |

FIG.6

| FACILITY ID | POSITION ID$_1$ | POSITION ID$_2$ | TYPE | ATTRIBUTE INFORMATION | | |
|---|---|---|---|---|---|---|
| | | | | SPAN LENGTH | RESISTANCE (R) | REACTANCE (X) |
| SP0001 | SS0001 | PO0001 | 3H | 21 | 220 | 150 |
| SP0002 | PO0001 | PO0002 | 3H | 29 | 220 | 150 |
| SP0003 | PO0002 | PO0003 | 3H | 32 | 220 | 150 |
| SP0004 | PO0003 | PO0004 | 3H | 32 | 220 | 150 |
| SP0005 | PO0004 | PO0005 | 3H | 29 | 220 | 150 |
| SP0006 | PO0005 | PO0006 | 3H | 25 | 220 | 150 |
| SP0007 | PO0006 | PO0007 | 3H | 31 | 220 | 150 |
| SP0008 | PO0007 | PO0008 | 3H | 24 | 220 | 150 |
| SP0009 | PO0007 | PO0008 | 3L | 24 | 390 | 240 |
| SP0010 | PO0008 | LL0001 | | 7 | 510 | 820 |
| SP0011 | PO0008 | PO0009 | 3H | 19 | 220 | 150 |
| SP0012 | PO0009 | PO0010 | 3H | 23 | 220 | 150 |
| SP0013 | PO0010 | PO0011 | 3H | 14 | 220 | 150 |
| SP0014 | PO0012 | PO0011 | 3L | 19 | 390 | 240 |
| SP0015 | PO0011 | LL0002 | | 9 | 510 | 820 |
| SP0016 | PO0011 | PO0012 | 3H | 19 | 220 | 150 |
| SP0017 | PO0012 | PO0013 | 3L | 18 | 390 | 240 |
| SP0018 | PO0013 | LL0003 | | 22 | 510 | 820 |
| SP0019 | PO0013 | LL0004 | | 21 | 510 | 820 |
| SP0020 | PO0012 | LL0005 | | 10 | 510 | 820 |
| SP0021 | PO0004 | PO0014 | 3H | 24 | 220 | 150 |
| SP0022 | PO0015 | PO0014 | 3L | 24 | 390 | 240 |
| SP0023 | PO0014 | LL0006 | | 12 | 510 | 820 |
| SP0024 | PO0014 | PO0015 | 3H | 24 | 220 | 150 |
| SP0025 | PO0015 | PO0016 | 3L | 16 | 390 | 240 |
| SP0026 | PO0016 | LL0007 | | 11 | 510 | 820 |
| SP0027 | PO0015 | LL0008 | | 11 | 510 | 820 |

FIG.7

| NODE ID | POSITION ID |
|---|---|
| SS0001 N01 | SS0001 |
| PO0001 N01 | PO0001 |
| PO0001 N02 | PO0001 |
| PO0002 N01 | PO0002 |
| PO0003 N01 | PO0003 |
| PO0004 N01 | PO0004 |
| PO0004 N02 | PO0004 |
| PO0005 N01 | PO0005 |
| PO0006 N01 | PO0006 |
| PO0007 N01 | PO0007 |
| PO0007 N02 | PO0007 |
| PO0008 N01 | PO0008 |
| PO0008 N02 | PO0008 |
| LL0001 N01 | LL0001 |
| PO0009 N01 | PO0009 |
| PO0009 N02 | PO0009 |
| PO0010 N01 | PO0010 |
| PO0011 N01 | PO0011 |
| PO0011 N02 | PO0011 |
| LL0002 N01 | LL0002 |
| PO0012 N01 | PO0012 |
| PO0012 N02 | PO0012 |
| PO0013 N01 | PO0013 |
| LL0003 N01 | LL0003 |
| LL0004 N01 | LL0004 |
| LL0005 N01 | LL0005 |
| PO0014 N01 | PO0014 |
| PO0014 N02 | PO0014 |
| LL0006 N01 | LL0006 |
| PO0015 N01 | PO0015 |
| PO0015 N02 | PO0015 |
| PO0016 N01 | PO0016 |
| LL0007 N01 | LL0007 |
| LL0008 N01 | LL0008 |

FIG.8

| BRANCH ID | NODE ID₁ | NODE ID₂ | FACILITY ID | OPEN-CLOSE SECTION |
|---|---|---|---|---|
| BR0001 | SS0001 N01 | PO0001 N01 | SP0001 | |
| BR0002 | PO0001 N01 | PO0001 N02 | PO0001 01 | 1 |
| BR0003 | PO0001 N02 | PO0002 N01 | SP0002 | |
| BR0004 | PO0002 N01 | PO0003 N01 | SP0003 | |
| BR0005 | PO0003 N01 | PO0004 N01 | SP0004 | |
| BR0006 | PO0004 N01 | PO0004 N02 | PO0004 01 | 1 |
| BR0007 | PO0004 N02 | PO0005 N01 | SP0005 | |
| BR0008 | PO0005 N01 | PO0006 N01 | SP0006 | |
| BR0009 | PO0006 N01 | PO0007 N01 | SP0007 | |
| BR0010 | PO0007 N01 | PO0007 N02 | PO0007 01 | |
| BR0011 | PO0007 N01 | PO0008 N01 | SP0008 | |
| BR0012 | PO0007 N02 | PO0008 N02 | SP0009 | |
| BR0013 | PO0008 N02 | LL0001 N01 | SP0010 | |
| BR0014 | LL0001 N01 | | LL0001 01 | |
| BR0018 | PO0008 N01 | PO0009 N01 | SP0011 | |
| BR0019 | PO0009 N01 | PO0009 N02 | PO0009 01 | 1 |
| BR0020 | PO0009 N02 | PO0010 N01 | SP0012 | |
| BR0021 | PO0010 N01 | PO0011 N01 | SP0013 | |
| BR0022 | PO0012 N02 | PO0011 N02 | SP0014 | |
| BR0023 | PO0011 N02 | LL0002 N01 | SP0015 | |
| BR0024 | LL0002 N01 | | LL0002 01 | |
| BR0028 | PO0011 N01 | PO0012 N01 | SP0016 | |
| BR0029 | PO0012 N01 | PO0012 N02 | PO0012 01 | |
| BR0030 | PO0012 N02 | PO0013 N01 | SP0017 | |
| BR0031 | PO0013 N01 | LL0003 N01 | SP0018 | |
| BR0032 | LL0003 N01 | | LL0003 01 | |
| BR0036 | PO0013 N01 | LL0004 N01 | SP0019 | |
| BR0037 | LL0004 N01 | | LL0004 01 | |
| BR0041 | PO0012 N02 | LL0005 N01 | SP0020 | |
| BR0042 | LL0005 N01 | | LL0005 01 | |
| BR0046 | PO0004 N01 | PO0014 N01 | SP0021 | |
| BR0047 | PO0015 N02 | PO0014 N02 | SP0022 | |
| BR0048 | PO0014 N02 | LL0006 N01 | SP0023 | |
| BR0049 | LL0006 N01 | | LL0006 01 | |
| BR0053 | PO0014 N01 | PO0015 N01 | SP0024 | |
| BR0054 | PO0015 N01 | PO0015 N02 | PO0015 01 | |
| BR0055 | PO0015 N02 | PO0016 N01 | SP0025 | |
| BR0056 | PO0016 N01 | LL0007 N01 | SP0026 | |
| BR0057 | LL0007 N01 | | LL0007 01 | |
| BR0061 | PO0015 N02 | LL0008 N01 | SP0027 | |
| BR0062 | LL0008 N01 | | LL0008 01 | |

FIG.9

| CONNECTION ID | POSITION ID | AMOUNT OF POWER CONSUMPTION (ACTIVE) | AMOUNT OF POWER CONSUMPTION (REACTIVE) |
|---|---|---|---|
| SS0001 N01 | SS0001 | | |
| PO0001 N01 | PO0001 | | |
| PO0001 N02 | PO0001 | | |
| PO0002 N01 | PO0002 | | |
| PO0003 N01 | PO0003 | | |
| PO0004 N01 | PO0004 | | |
| PO0004 N02 | PO0004 | | |
| PO0005 N01 | PO0005 | | |
| PO0006 N01 | PO0006 | | |
| PO0007 N01 | PO0007 | | |
| PO0007 N02 | PO0007 | | |
| PO0008 N01 | PO0008 | | |
| PO0008 N02 | PO0008 | | |
| LL0001 N01 | LL0001 | 200 | 20 |
| PO0009 N01 | PO0009 | | |
| PO0009 N02 | PO0009 | | |
| PO0010 N01 | PO0010 | | |
| PO0011 N01 | PO0011 | | |
| PO0011 N02 | PO0011 | | |
| LL0002 N01 | LL0002 | 220 | 22 |
| PO0012 N01 | PO0012 | | |
| PO0012 N02 | PO0012 | | |
| PO0013 N01 | PO0013 | | |
| LL0003 N01 | LL0003 | 180 | 18 |
| LL0004 N01 | LL0004 | 240 | 24 |
| LL0005 N01 | LL0005 | 210 | 21 |
| PO0014 N01 | PO0014 | | |
| PO0014 N02 | PO0014 | | |
| LL0006 N01 | LL0006 | 300 | 30 |
| PO0015 N01 | PO0015 | | |
| PO0015 N02 | PO0015 | | |
| PO0016 N01 | PO0016 | | |
| LL0007 N01 | LL0007 | 240 | 24 |
| LL0008 N01 | LL0008 | 230 | 23 |

FIG.10

| BRANCH ID | NODE ID₁ | NODE ID₂ | FACILITY ID | OPEN-CLOSE SECTION | REACTANCE (X) | RESIST-ANCE (R) |
|---|---|---|---|---|---|---|
| BR0001 | SS0001 N01 | PO0001 N01 | SP0001 | | 3150 | 4620 |
| BR0002 | PO0001 N01 | PO0001 N02 | PO0001 01 | 1 | 0 | 0 |
| BR0003 | PO0001 N02 | PO0002 N01 | SP0002 | | 4350 | 6380 |
| BR0004 | PO0002 N01 | PO0003 N01 | SP0003 | | 4800 | 7040 |
| BR0005 | PO0003 N01 | PO0004 N01 | SP0004 | | 4800 | 7040 |
| BR0006 | PO0004 N01 | PO0004 N02 | PO0004 01 | 1 | 0 | 0 |
| BR0007 | PO0004 N02 | PO0005 N01 | SP0005 | | 4350 | 6380 |
| BR0008 | PO0005 N01 | PO0006 N01 | SP0006 | | 3750 | 5500 |
| BR0009 | PO0006 N01 | PO0007 N01 | SP0007 | | 4650 | 6820 |
| BR0010 | PO0007 N01 | PO0007 N02 | PO0007 01 | | 31300 | 36800 |
| BR0011 | PO0007 N01 | PO0008 N01 | SP0008 | | 3600 | 5280 |
| BR0012 | PO0007 N02 | PO0008 N02 | SP0009 | | 5760 | 9360 |
| BR0013 | PO0008 N02 | LL0001 N01 | SP0010 | | 5740 | 3570 |
| BR0014 | LL0001 N01 | | LL0001 01 | | 0 | 0 |
| BR0018 | PO0008 N01 | PO0009 N01 | SP0011 | | 2850 | 4180 |
| BR0019 | PO0009 N01 | PO0009 N02 | PO0009 01 | 1 | 0 | 0 |
| BR0020 | PO0009 N02 | PO0010 N01 | SP0012 | | 3450 | 5060 |
| BR0021 | PO0010 N01 | PO0011 N01 | SP0013 | | 2100 | 3080 |
| BR0022 | PO0012 N02 | PO0011 N02 | SP0014 | | 4560 | 7410 |
| BR0023 | PO0011 N02 | LL0002 N01 | SP0015 | | 7380 | 4590 |
| BR0024 | LL0002 N01 | | LL0002 01 | | 0 | 0 |
| BR0028 | PO0011 N01 | PO0012 N01 | SP0016 | | 2850 | 4180 |
| BR0029 | PO0012 N01 | PO0012 N02 | PO0012 01 | | 31300 | 36800 |
| BR0030 | PO0012 N02 | PO0013 N01 | SP0017 | | 4320 | 7020 |
| BR0031 | PO0013 N01 | LL0003 N01 | SP0018 | | 18040 | 11220 |
| BR0032 | LL0003 N01 | | LL0003 01 | | 0 | 0 |
| BR0036 | PO0013 N01 | LL0004 N01 | SP0019 | | 17220 | 10710 |
| BR0037 | LL0004 N01 | | LL0004 01 | | 0 | 0 |
| BR0041 | PO0012 N02 | LL0005 N01 | SP0020 | | 8200 | 5100 |
| BR0042 | LL0005 N01 | | LL0005 01 | | 0 | 0 |
| BR0046 | PO0004 N01 | PO0014 N01 | SP0021 | | 3600 | 5280 |
| BR0047 | PO0015 N02 | PO0014 N02 | SP0022 | | 5760 | 9360 |
| BR0048 | PO0014 N02 | LL0006 N01 | SP0023 | | 9840 | 6120 |
| BR0049 | LL0006 N01 | | LL0006 01 | | 0 | 0 |
| BR0053 | PO0014 N01 | PO0015 N01 | SP0024 | | 3600 | 5280 |
| BR0054 | PO0015 N01 | PO0015 N02 | PO0015 01 | | 31300 | 36800 |
| BR0055 | PO0015 N02 | PO0016 N01 | SP0025 | | 3840 | 6240 |
| BR0056 | PO0016 N01 | LL0007 N01 | SP0026 | | 9020 | 5610 |
| BR0057 | LL0007 N01 | | LL0007 01 | | 0 | 0 |
| BR0061 | PO0015 N02 | LL0008 N01 | SP0027 | | 9020 | 5610 |
| BR0062 | LL0008 N01 | | LL0008 01 | | 0 | 0 |

FIG.13

| FACILITY ID | DATE | TIME | AMOUNT OF POWER CONSUMPTION 18a |
|---|---|---|---|
| LL1 | 2012/9/5 | 15:10:19 | U12 |
| LL4 | 2012/9/5 | 14:42:33 | U40 |
| LL3 | 2012/9/5 | 14:40:29 | U30 |
| LL1 | 2012/9/5 | 14:40:18 | U11 |
| LL2 | 2012/9/5 | 14:38:59 | U20 |
| ⋮ | ⋮ | ⋮ | ⋮ |

FIG.23

| AMOUNT OF POWER CONSUMPTION | UNIT PRICE (YEN) |
|---|---|
| PER 1 kWh | 18 |

| CAPACITY | UNIT PRICE (YEN) |
|---|---|
| 30 kVA | 160,000 |
| 10 kVA | 120,000 |

| TRANS-FORMER CAPACITY | LOSS (PER DAY) | | LOSS (ANNUAL) | |
|---|---|---|---|---|
| | kWh | YEN | kWh | YEN |
| 30 kVA | 0.349 | 6 | 127.543 | 2,296 |
| 10 kVA | 1.064 | 19 | 388.213 | 6,988 |
| DIFFERENCE | 0.715 | 13 | 261 | 4,692 |

FIG.27

| CAPACITY | UNIT PRICE (YEN) |
|---|---|
| 30 kVA | 480,000 |
| 10 kVA | 360,000 |
| DIFFERENCE | 120,000 |

FIG.28

| NUMBER OF YEARS | 1 | 2 | 3 | 4 | 5 | | 26 | 27 | 28 | 29 | 30 | 31 | 32 |
|---|---|---|---|---|---|---|---|---|---|---|---|---|---|
| ACCUMULATED LOSS | 0 | 4,692 | 9,384 | 14,076 | 18,768 | | 121,993 | 126,685 | 131,378 | 136,070 | 140,762 | 145,454 | 150,146 |
| DIFFERENCE | 120,000 | 120,000 | 120,000 | 120,000 | 120,000 | | 120,000 | 120,000 | 120,000 | 120,000 | 120,000 | 120,000 | 120,000 |

LOSS CALCULATION METHOD AND LOSS CALCULATING DEVICE

CROSS-REFERENCE TO RELATED APPLICATIONS

This application is a continuation of application Ser. No. 14/331,663, filed Jul. 15, 2014, which is based upon and claims the benefit of priority of the prior Japanese Patent Application No 2013-178653, filed on Aug. 29, 2013, the entire contents of which are incorporated herein by reference.

FIELD

The embodiments discussed herein are related to a loss calculation method and a loss calculating device.

BACKGROUND

In power distribution systems, widely used are distribution facilities whose facility capacity can withstand a peak load. The facility capacity of such a distribution facility is determined based on a peak load current derived in installation of the distribution facility. Every time the load state is changed after the installation or the distribution facility is replaced because of aging, the facility capacity of the distribution facility is determined based on the latest load state. Conventional technologies are described in Japanese Laid-open Patent Publication No. 2007-080260, for example.

Distribution facilities, such as transformers, consume electric power themselves. The electric power consumed by the distribution facilities is generated and then consumed while being transmitted to a consumer. Because the electric power is not used by the consumer, it is considered as a loss. Such power loss in a distribution system is referred to as a distribution loss. The distribution loss increases as the distribution capacity of a distribution system decreases. When the distribution capacity of the distribution facility decreases depending on the load, the distribution loss increases.

It has been difficult to grasp the electric current value in each distribution facility of the distribution system, and thus the distribution loss of each distribution facility has not been grasped with high accuracy.

SUMMARY

According to an aspect of an embodiment, a computer-readable recording medium stores therein a program. The program causes a computer to execute a process that includes calculating a load current of each distribution facility based on a sending voltage in a power source facility and load information on power consumption facilities in an electrical circuit including the power source facility, the distribution facilities, and the power consumption facilities connected to one another to form the electrical circuit; and calculating an amount of power loss in each distribution facility based on the calculated load current of each distribution facility.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is an example diagram of a location table;
FIG. 5 is an example diagram of a unit table;
FIG. 6 is an example diagram of a span table;
FIG. 7 is an example diagram of a node table;
FIG. 8 is an example diagram of a branch table
FIG. 9 is an example diagram of a current node table;
FIG. 10 is an example diagram of a current branch table;
FIG. 13 is an example diagram of a load table;
FIG. 23 is an example diagram of unit price information;
FIG. 24 is an example diagram of facility performance information;
FIG. 26 is a diagram for explaining a change in the loss price caused by replacement of a distribution facility;
FIG. 27 is a diagram for explaining a change in the unit price caused by replacement of the distribution facility;
FIG. 28 is an example diagram of comparison of the accumulated value of the loss price per year with the difference in the unit price.

DESCRIPTION OF EMBODIMENTS

Preferred embodiments of the present invention will be explained with reference to the accompanying drawings.

The embodiments are not intended to limit the disclosed technology. The embodiments may be appropriately combined without contradicting the processing contents.

[a] First Embodiment

Configuration of a Loss Calculating Device

Figure 1:
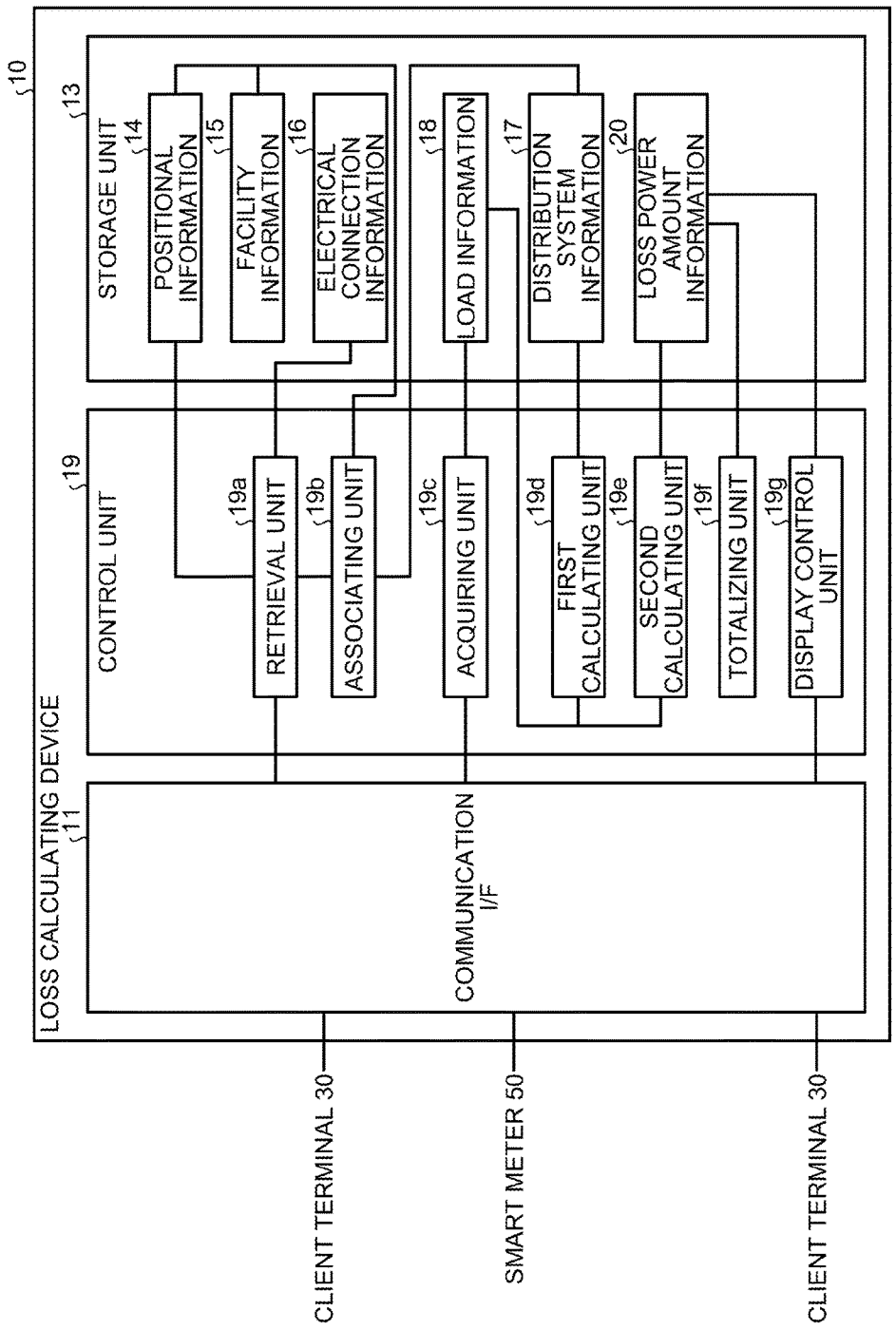
FIG. 1 is a block diagram of a functional configuration of a loss calculating device according to a first embodiment of the present invention.

FIG. 1 is a block diagram of a functional configuration of a loss calculating device according to a first embodiment of the present invention. A loss calculating device 10 illustrated in FIG. 1 is provided to a distribution system between a substation of an electric power supplier and a load facilities of a consumer to perform loss calculation processing for calculating a distribution loss in each distribution facility.

An aspect on the loss calculating device 10 may be provided as a Web server that performs the loss calculation processing or a cloud that supplies services relating to the loss calculation processing by outsourcing. Another aspect of the loss calculating device 10 may be provided by preinstalling or installing a loss calculation program supplied as package software or online software on a desired computer.

As illustrated in FIG. 1, the loss calculating device 10 is communicably connected to other devices including a client terminal 30 and a smart meter 50 via a predetermined network. Examples of the network include desired types of wired or wireless communication networks, such as the Internet, a local area network (LAN), and a virtual private network (VPN). A desired number of client terminals 30 and smart meters 50 may be connected.

The client terminal 30 is a terminal device on a recipient side that receives the loss calculation service. Examples of the client terminal 30 include a fixed terminal, such as a personal computer (PC), and a mobile terminal, such as a mobile phone, a personal handy-phone system (PHS), and a personal digital assistant (PDA). The client terminal 30 is used by a member of the electric power supplier, such as a person in charge and an administrator in a distribution department.

The smart meter 50 is an electric power meter with a communication function. The smart meter 50 is connected to a distribution board of the consumer, for example. An aspect of the smart meter 50 measures electric power used by the load facilities of the consumer every predetermined period (e.g., every 30 minutes). The smart meter 50 accumulates and measures the electric power used by the load facilities. In the description below, the value of the accumulated and measured electric power used by the load facilities may be referred to as "the amount of power consumption". The smart meter 50 transmits the amount of power consumption to the loss calculating device 10. While the smart meter uploads the amount of power consumption every predetermined period in this example, the smart meter may upload the amount of power consumption intermittently. The smart meter 50 may upload the amount of power consumption not actively but in response to a request from the loss calculating device 10.

As illustrated in FIG. 1, the loss calculating device 10 includes a communication interface (I/F) 11, a storage unit 13, and a control unit 19. The loss calculating device 10 may include various types of functional units included in a known computer, such as various types of input-output devices and image-capturing devices, besides the functional units illustrated in FIG. 1.

The communication I/F 11 controls communications with other devices including the client terminal 30 and the smart meter 50, for example. Examples of an aspect of the communication I/F 11 include a network interface card, such as a LAN card. The communication I/F 11, for example, receives various types of information, such as various types of instruction information, from the client terminal 30, and transmits image data of various types of screens from the loss calculating device 10 to the client terminal 30.

The storage unit 13 is a storage device that stores therein various types of computer programs, such as an operating system (OS), a distribution management program, and a loss calculation program executed by the control unit 19. Examples of an aspect of the storage unit 13 include a semiconductor memory device such as a flash memory, and a storage device such as a hard disk and an optical disc. The storage unit 13 is not limited to the types of storage devices described above and may be a random access memory (RAM) or a read only memory (ROM).

The storage unit 13 scores therein positional information 14, facility information 15, electrical connection information 16, distribution system information 17, load information 18, and power loss amount information 20 as an example of data used by a computer program executed by the control unit 19. The storage unit 13 may also store therein other electronic data, such as map information containing the distribution system controlled by the electric power supplier, besides the information described above.

The loss calculating device 10 according to the present embodiment manages the distribution system in three ways: position management to manage a position at which a facility is located; facility management to manage each facility; and electrical connection management to manage facilities electrically connected to each other.

In the position management the loss calculating device 10 uses a position "location" at which a predetermined facility, such as a substation, a utility pole, and a transformer, out of the facilities constituting the distribution system as an entity. In the facility management, the loss calculating device 10 uses a facility "unit" relating to one position out of the facilities constituting the distribution system and a facility "span" relating to two positions as entities. In the electrical connection management, the loss calculating device 10 uses a connection "node" at which facilities are electrically connected to each other and a facility "branch" determined by a plurality of connections as entities.

Figure 2:
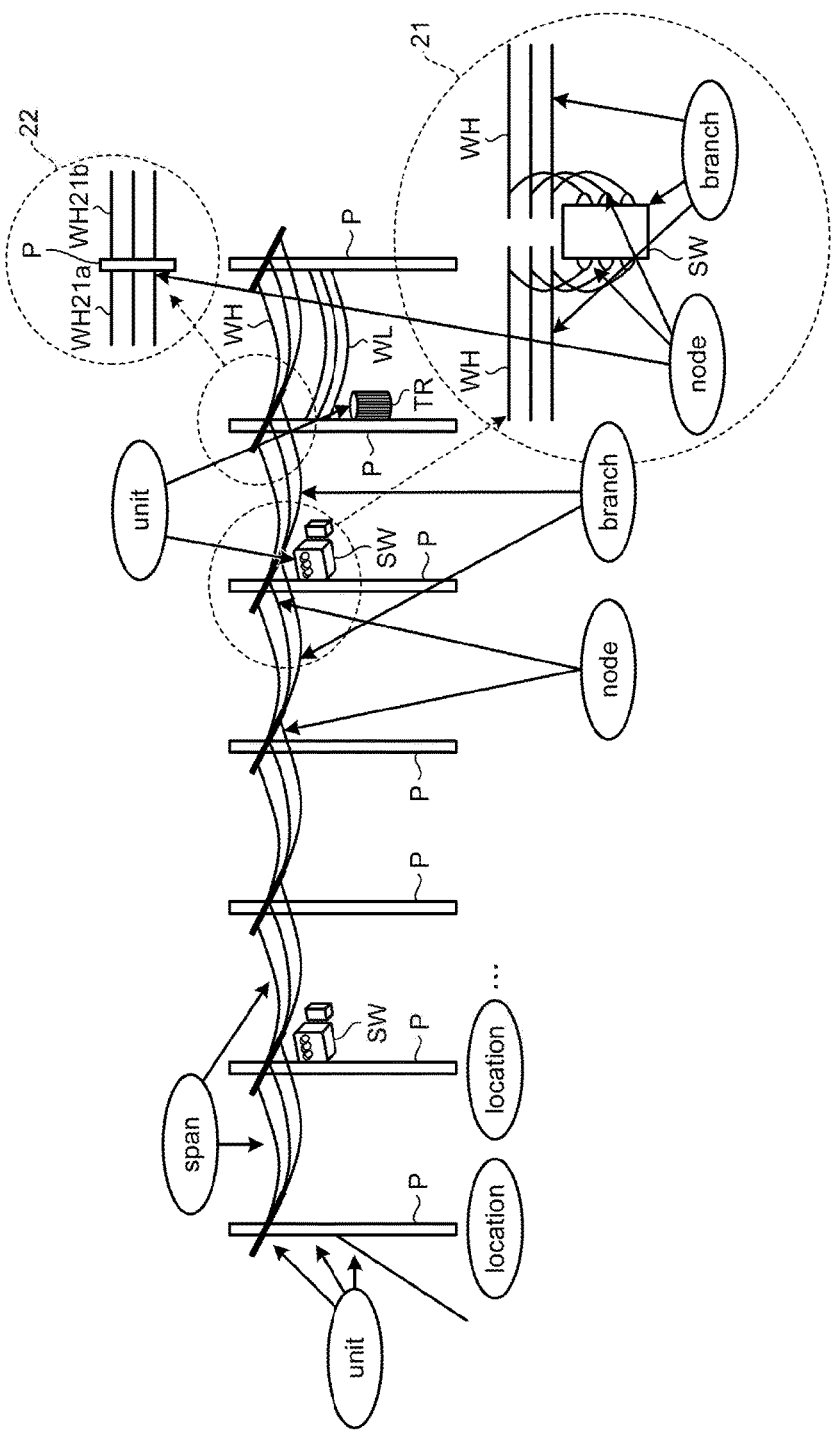
FIG. 2 is a schematic of an aspect of entities.

FIG. 2 is a schematic of an aspect of the entities. As illustrated in FIG. 2, examples of the location include a position at which a facility provided in a non-bridging manner, such as a utility pole P and a pole transformer TR, is located. In addition to this, the concept of the location also includes a position at which a substation (SS), which is not illustrated, is located and a position at which a transformer is located. While the facilities provided on the ground are exemplified above, the concept of the location also includes a position at which a facility provided under the ground, such as a manhole and a hand hole, is located.

Examples or the unit include the utility pole P, a switch SW, and the pole transformer TR. In addition to this, the concept of the unit also includes the SS, a step voltage regulator (SVR), various types of meters, such as the smart meter 50, and a manhole and a hand hole provided under the ground, none of which is illustrated.

Examples of the span include an electric wire WH provided to a high-voltage system that transmits high-voltage power between the SS and the pole transformer TR, that is, what is called a "high-voltage wire". Examples of the span also include an electric wire WL provided to a section between the pole transformer TR and a lead-in wire in a low-voltage system that transmits low-voltage power between the pole transformer TR and the load facilities of the consumer, that is, what is called a "low-voltage wire". Examples of the span also include an electric wire provided to a section between the lead-in wire and the load facilities, that is, what is called a "lead-in wire". Examples of the span also include a cable buried in the ground. A plurality of (e.g., three or two) electric wires W, such as the high-voltage wires WH and the low-voltage wires WL, provided between the utility poles P may be collectively considered as a span.

Examples of the node include a connection of the high-voltage wire WH and the switch SW illustrated in the enlarged view 21 in FIG. 2, a connection of the high-voltage wire WH and the pole transformer TR, and a connection of the pole transformer TR and the low-voltage wire WL. In addition to this, the concept of the node also includes a point at which a high-voltage wire WH21a and a high-voltage wire WH21b are connected as illustrated in the enlarged view 22 in FIG. 2. Specifically, even when the high-voltage wire WH21a and the high-voltage wire WH21b are hung by a utility pole P serving as a through pole, the high-voltage wire WH21a and the high-voltage wire WH21b are considered to be electrically connected. A point at which the high-voltage wires WHs are connected is considered to be a virtual node.

Examples of the branch include various types of facilities including the utility pole P, the high-voltage wire WH, the switch SW, the pole transformer TR, and the low-voltage wire WL illustrated in FIG. 2. In addition to this, the concept of the branch also includes the SS, the lead-in wire, the smart meter 50, and the load facilities, none of which is illustrated. Facilities positioned at an end, such as the SS and the load facilities, may have one node alone.

Figure 3:
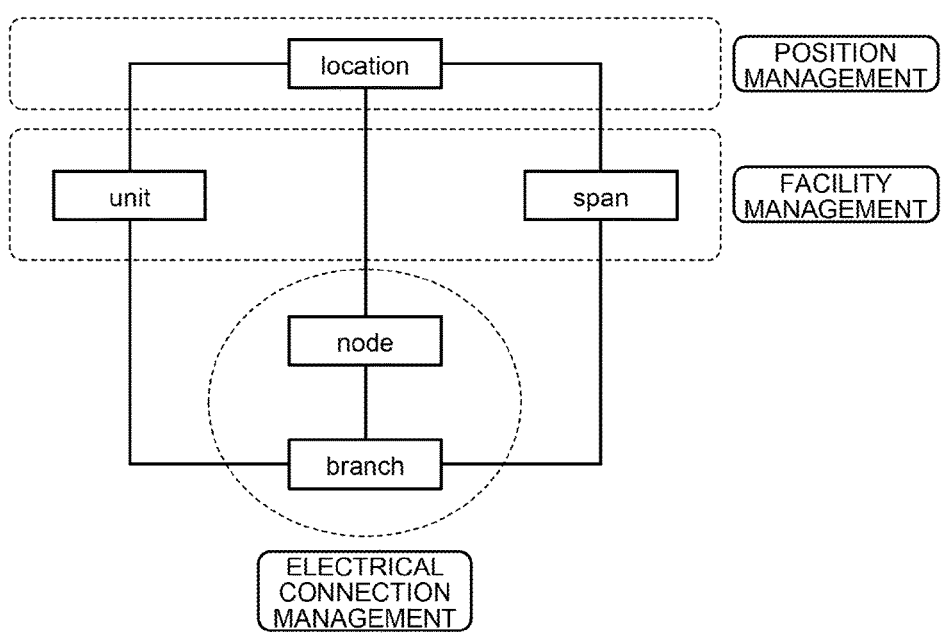
FIG. 3 is an example diagram of the interrelation of the entities.

The entities including the location, the unit, the span, the node, and the branch have the relation illustrated in FIG. 3. FIG. 3 is an example diagram of the interrelation of the entitles. As illustrated in FIG. 3, the unit and the span are interrelated with each other in that the positions thereof are collectively managed with respect to the location. Furthermore, the unit and the span are interrelated with each other in that the facilities thereof are collectively managed with respect to the branch. The node is interrelated in that the connection thereof is collectively managed with respect to the location and the branch.

Referring back to FIG. 1, the positional information 14 includes a location table 14a that manages the location. The facility information 15 includes a unit table 15a that manages the unit and a span table 15b that manages the span. The electrical connection information 16 includes a node table 16a that manages the node and a branch table 16b that manage the branch. The distribution system information 17 includes a current node table 17a and a current branch table 17b, which will be described later.

In an aspect of the location table 14a, items including a position identifier (ID), position identification, a longitude, and a latitude are associated with one another. The "position ID" is identification information for identifying a position at which a facility is located. The "position identification" indicates identification of the type of the position, including a substation (SS), a utility pole (POLE), and a load facility (LOADL), for example. The information stored in the location table 14a is acquired from other existing systems, such as a distribution facility management system that manages the facilities of the distribution system. The location table 14a acquires positional information on a specific facility, such as a substation, a utility pole, and a transformer.

FIG. 4 is an example diagram of the location table 14a. It is indicated that the location of a position ID "SS0001" illustrated in FIG. 4 is positioned at 128 degrees 08 minutes 48 seconds 66 east longitude and 50 degrees 27 minutes 23 seconds 016 north latitude and has an SS, for example. The various types of IDs illustrated in the figures following FIG. 4 each have a character string with which the type of the facility can be identified, such as "SS" representing a substation, "PO" representing a utility pole, and "LL" representing a load facility, at the head of the character string constituting the ID. The various types of IDs do not necessarily each have a character string with which the type of the facility can be identified at the head of the character string constituting the ID. The various types of IDs may each have a value with which the facility can be uniquely identified. In this example, the longitude and the latitude are used as the items that identify the position of the facility. Alternatively, other items, such as a local coordinate value and an address, may be used.

In an aspect of the unit table 15a, items including a facility ID, a position ID, a type, and attribute information are associated with one another. The "facility ID" is identification information for identifying a facility, and the unit table 15a stores therein the facility ID of a unit alone. The "type" indicates the type of the unit, including a utility pole (POLE), a switch (SW), a pole transformer (BANK), and a load facility (LOADL), for example. The "attribute information" is information on an attribute of the unit, such as a model number and performance of the unit. If the unit is a transformer, for example, capacity and a voltage ratio of the transformer are registered. The capacity of the transformer may be used to calculate a voltage drop when electrical connection information on the facilities of the current system is extracted. If the unit is a transformer, for example, a resistance, a reactance, and a voltage ratio of the transformer are registered. The information stored in the unit table 15a is acquired from other existing systems, such as a distribution facility management system. The unit table 15a registers therein attribute information on a facility classified as a unit out of the acquired attribute information on the facilities.

FIG. 5 is an example diagram of the unit table 15a. It is indicated that the unit of a facility ID "PO0001P1" illustrated in FIG. 5 is a utility pole located at the position corresponding to a position ID "PO0001", that is, at 128 degrees 08 minutes 41 seconds 76 east longitude and 50 degrees 27 minutes 23 seconds 021 north latitude as illustrated in FIG. 4, for example. It is also indicated that the unit of a facility ID "PO000101" illustrated in FIG. 5 is a switch located at the position corresponding to the position ID "PO0001", that is, at 128 degrees 08 minutes 41 seconds 76 east longitude and 50 degrees 27 minutes 23 seconds 021 north latitude as illustrated in FIG. 4. It is also indicated that the unit of a facility ID "PO000701" illustrated in FIG. 5 is a pole transformer having a voltage ratio of 1 and located at the position corresponding to a position ID "PO0007", that is, at 128 degrees 08 minutes 34 seconds 30 east longitude and 50 degrees 27 minutes 27 seconds 844 north latitude as illustrated in FIG. 4.

In an aspect of the span table 15b, items including a facility ID, a position $ID_1$, a position $ID_2$, a type, and attribute information are associated with one another. The "facility ID" is identification, information, for identifying a facility, and the span table 15b stores therein the facility ID of a span alone. The "position $ID_1$" is a position ID of one of two position IDs relating to the span, whereas the "position $ID_2$" is a position ID of the other of the two position IDs relating to the span. The "type" indicates the type of the span, including a high-voltage wire, a low-voltage wire, and a lead-in wire, for example. The "attribute information" is information on an attribute of the span, such as a model number, the thickness, a material, the span length, a resistance per unit (m), and a reactance per unit (m) of the span. The span length, the resistance per unit, and the reactance per unit may be used to calculate a voltage drop when the electrical connection information on the facilities of the current system is extracted. The information stored in the span table 15b is acquired from other existing systems, such as a distribution facility management system. The span table 15b registers therein attribute information on a facility classified as a span out of the acquired attribute information on the facilities.

FIG. 6 is an example diagram of the span table 15b. It is indicated that the span of a facility ID "SP0001" illustrated in FIG. 6 is a three-phase high-voltage wire provided to a section between the position corresponding to a position $ID_1$ "SS0001" and the position corresponding to a position $ID_2$ "PO0001", for example. As explained with reference to FIG. 4, the section corresponds to a section from 128 degrees 08 minutes 48 seconds 66 east longitude and 50 degrees 27 minutes 23 seconds 016 north latitude to 128 degrees 08 minutes 41 seconds 76 east longitude and 50 degrees 27 minutes 23 seconds 021 north latitude. It is also indicated that the span, length of the span of the facility ID "SP0001" is "21 m", that the resistance is "220 Ω/m", and that the reactance is "150 Ω/m". In the type illustrated in FIG. 6, 3H indicates that the span is a single-phase three-wire high-voltage wire, 3L indicates that the span is a single-phase three-wire low-voltage wire, and a blank indicates that the span is a lead-in wire.

In an aspect of the node table 16a, items including a node ID and a position ID are associated with each other. The "node ID" is identification information for identifying a node. The information stored in the node table 16a is acquired from other existing systems, such as a distribution facility management system and a distribution automation system that monitors a distribution system and remotely operates a switch. A node is, for example, extracted from information on facilities of a low-voltage system acquired from the distribution facility management system or information on facilities of a high-voltage system acquired from the distribution automation system. Subsequently, the node is registered in the node table 16a in a manner associated with the position thereof.

FIG. 7 is an example diagram of the node table 16a. It is indicated that the connection of a node ID "SS0001N01" illustrated in FIG. 7 is located at the position corresponding to the position ID "SS0001", that is, at 128 degrees 08 minutes 48 seconds 66 east longitude and 50 degrees 27 minutes 23 seconds 016 north latitude as illustrated in FIG. 4, for example. It is also indicated that the connections of node IDs "PO0001N01" and "PO0001N02" illustrated in FIG. 7 are located at the same position corresponding to the position ID "PO0001", that is, at 128 degrees 08 minutes 41 seconds 76 east longitude and 50 degrees 27 minutes 23 seconds 021 north latitude as illustrated in FIG. 4.

In an aspect of the branch table 16b, items including a branch ID, a node $ID_1$, a node $ID_2$, a facility ID, and an open-close section are associated with one another. The "branch ID" is identification information for identifying a branch. The "node $ID_1$" is a node ID of one of two node IDs included in the branch, whereas the "node $ID_2$" is a node ID of the other of the two node IDs included in the branch. A branch positioned at an end, such as an SS and a load facility, may have one of the node $ID_1$ and the node $ID_2$ alone. The node $ID_1$ out of the node $ID_1$ and the node $ID_2$, for example, is a node ID of a connection closer to the primary side than the node $ID_2$, that is, closer to the SS. The node $ID_2$ is a node ID of a connection closer to the secondary side than the node $ID_1$, that is, closer to the load facility. The "facility ID" is identification information for identifying a facility, and the branch table 16b stores therein the facility ID of a unit or a span. The "open-close section" indicates an open-close state of a switch. When the branch is a switch, one of an "open state" and a "closed state" is set in the open-close section, whereas when the branch is not a switch, a "blank" is set.

The information stored in the branch table 16b is acquired from other existing systems, such as a distribution facility management system and a distribution automation system. A branch is, for example, extracted from information on facilities of a low-voltage system acquired from the distribution facility management system or information on facilities of a high-voltage system acquired from the distribution automation system. Subsequently, the branch is registered in the branch table 16b in a manner associated with the node included in the branch.

FIG. 8 is an example diagram of the branch table 16b. It is indicated that the branch of a branch ID "BR0001" illustrated in FIG. 8 is a high-voltage wire of a facility ID "SP0001" defined by a node $ID_1$ "SS0001N01" and a node $ID_2$ "PO0001N01", for example. It is also indicated that the branch of a branch ID "BR0002" illustrated in FIG. 8 is a switch of a facility ID "PO000101" defined by a node $ID_1$ "PO0001N01" and a node $ID_2$ "PO0001N02". Because "1" is set in the open-close section of the branch of the branch ID "BR0002", it is indicated that the switch is in the closed state. A value "0" set in the open-close section illustrated in FIG. 8 indicates that the switch is in the open state, and a blank in the open-close section indicates that the facility is not a switch. The switch in the closed state allows electricity to pass therethrough, whereas the switch in the open state does not allow electricity to pass therethrough.

The distribution system information 17, the load information 18, and the power loss amount information 20 out of the information stored in the storage unit 13 other than the positional information 14, the facility information 15, and the electrical connection information 16 will be described later in explanations of functional units that generate, acquire, and use these pieces of information.

The control unit 19 includes an internal memory that stores therein a computer program and control data defining various types of processing procedures and performs various types of processing with these pieces of data. As illustrated in FIG. 1, the control unit 19 includes a retrieval unit 19a, an associating unit 19b, an acquiring unit 19c, a first calculating unit 19d, a second calculating unit 19e, a totalizing unit 19f, and a display control unit 19g.

The retrieval unit 19a is a processing unit that retrieves a branch. The retrieval unit 19a refers to the electrical connection information 16 to search for a yet-to-be-searched-for node out of nodes included in a combination of nodes using a predetermined node as an origin, thereby retrieving a branch corresponding to the combination.

In one aspect, when a browsing request for distribution system information is received via the client terminal 30 or a predetermined period has passed since the end of the previous processing, the retrieval unit 19a starts processing. The retrieval unit 19a retrieves a position ID whose position type is a substation "SS" out of the position IDs stored in the location table 14a. The retrieval unit 19a registers the position ID of SS retrieved from the location table 14a in a search list stored in an internal memory, which is not illustrated. The search list registers therein a yet-to-besearched-for node and branch found in the searching as needed besides the position ID of SS to be searched for. While the retrieval unit 19a retrieves the position ID of SS from the location table 14a in this example, the retrieval unit 19a may retrieve a node ID whose character string begins with "SS" out of the node IDs stored in the node table 16a and the branch table 16b.

Subsequently, the retrieval unit 19a selects one position ID of SS registered in the search list. The retrieval unit 19a retrieves a node corresponding to the selected position ID of SS from the nodes stored in the node table 16a. The retrieval unit 19a then registers the record of the node retrieved from the node table 16a in the current node table 17a stored in the storage unit 13 as the distribution system information 17. The retrieval unit 19a also registers the node retrieved from the node table 16a in the search list. In the case of SS having a plurality of SS banks, even if the retrieval is performed with one position ID, records of a plurality of nodes are retrieved.

Subsequently, the retrieval unit 19a selects one node registered in the search list. The retrieval unit 19a retrieves a combination of node IDs including the selected node from the branches stored in the branch table 16b, that is, a record of a branch including a combination of a node $ID_1$ and a node $ID_2$. The retrieval unit 19a then registers the record of the branch retrieved from the branch table 16b in the current branch table 17b stored in the storage unit 13 as the distribution system information 17. The retrieval unit 19a also registers the branch retrieved from the branch table 16b in the search list. The information registered in the search list simply needs to be information for identifying the branch. At least one of the branch ID and the facility ID may be registered, for example.

Subsequently, the retrieval unit 19a selects one branch registered in the search list. The retrieval unit 19a retrieves attribute information corresponding to the facility ID of the selected branch from the span table 15b. If the branch is a span, the retrieval unit 19a can retrieve the attribute information from the span table 15b. If the branch is a unit, the retrieval unit 19a fails to retrieve the attribute information. If the retrieval unit 19a fails to retrieve the attribute information from the span table 15b, the retrieval unit 19a retrieves the attribute information corresponding to the facility ID of the selected branch from the unit table 15a.

If a second node making a pair with the node used for the searching in the combination of nodes is not a blank, the retrieval unit 19a determines whether the branch is a switch. If the branch is a switch, the retrieval unit 19a determines whether the switch is in the closed state, that is, whether "1" is set in the open-close section. If the switch is in the closed state, the retrieval unit 19a retrieves the record of the second node from the node table 16a and registers the record in the current node table 17a in the distribution system information 17. The retrieval unit 19a adds the second node to the search list as a yet-to-be-searched-for node.

The retrieval unit 19a repeats the processing from the selection of a yet-to-be-searched-for branch until the search for all the branches registered in the search list ends. If all the branches registered in the search list are searched for, the retrieval unit 19a repeats the processing from the selection of a yet-to-be-searched-for node until the search for all the nodes registered in the search list ends. Subsequently, the retrieval unit 19a repeats the processing from the selection of a yet-to-be-searched-for position ID of SS until the search for all the position ID of SS registered in the search list ends.

The associating unit 19b is a processing unit that associates a combination of connections on which searching is performed and a facility obtained as a result of retrieval with attribute information corresponding to the facility obtained as the result of the retrieval out of the attribute information included in the facility information 15. In one aspect, the associating unit 19b associates a record of a branch on which searching is performed with attribute information on the branch retrieved from tine span table 15b or the unit fable 15a. The associating unit 19b, for example, registers attribute information on a branch in a manner associated with the facility ID or the branch ID of the branch used to search the span table 15b or the unit table 15a out of the records stored in the current branch table 17b. The associating unit 19b may retrieve a position ID corresponding to the facility ID of the branch from the unit table 15a or the span table 15b and further associate the position ID with the record of the branch.

The following specifically describes the contents of the processing performed by the retrieval unit 19a and the associating unit 19b with reference to the tables illustrated in FIG. 4 to FIG. 8. The position ID "SS0001" whose position type is a substation "SS" is retrieved from the position IDs stored in the location table 14a illustrated in FIG. 4. The position ID "SS0001" of SS retrieved from the location table 14a is registered in the search list. Because no other position ID than the position ID "SS0001" of SS is registered in the search list, the position ID "SS0001" is selected. In response to this, the node ID "SS0001N01" corresponding to the selected position ID "SS0001" of SS is retrieved from the nodes stored in the node table 16a illustrated in FIG. 7. Subsequently, the record of the node ID "SS0001N01" retrieved from the node table 16a is registered in the current node table 17a. The node ID "SS0001N01" retrieved from the node table 16a is also registered in the search list. Because no other node ID than the node ID "SS0001N01" is registered in the search list, the node ID "SS0001N01" is selected.

A branch of the facility ID "SP0001" associated with a combination of the node $ID_1$ "SS0001N01" and the node $ID_2$ "PO0001N01" including the selected node ID "SS0001N01" is retrieved from the branches stored in the branch table 16b illustrated in FIG. 8. Subsequently, the record of the branch of the facility ID "SP0001" retrieved from the branch table 16b is registered in the current branch table 17b. The facility ID "SP0001" retrieved from the branch table 16b is also registered in the search list. Because no other facility ID than the facility ID "SP0001" is registered in the search list, the facility ID "SP0001" is selected.

As a result, attribute information "a span length of 21 m, a resistance $R_{H1}$, and a reactance $X_{H1}$" of a span corresponding to the selected facility ID "SP0001" is retrieved from the span table 15b illustrated in FIG. 6. In this example, the attribute information on the span is retrieved. In the case of a facility ID whose character string begins with characters other than "SP", no attribute information is retrieved from the span table 15b, but attribute information on a unit is retrieved from the unit table 15a illustrated in FIG. 5.

Based on the acquired attribute information "a span length of 21 m, a resistance of 220 Ω/m, and a reactance of 150 Ω/m", a resistance of 4621 (220×21) Ω and a reactance of 3150 (150×21) Ω are registered in the current branch table 17b in a manner associated with the facility ID "SP0001".

In the combination of the node $ID_1$ "SS0001N01" and the node $ID_2$ "PO0001N01", "PO0001N01" is set to a second node ID making a pair with the node ID "SS0001N01" used for the searching. Because the second node ID is not a blank, it is determined whether the branch of the facility ID "SP0001" is a switch. Because the branch of the facility ID "SP0001" has a blank in the open-close section, the branch is not a switch. Thus, the record of the second node ID "PO001N01" is retrieved from the node table 16a and then is registered in the current node table 17a in the distribution system information 17. The second node ID "PO0001N01" is added to the search list as a yet-to-be-searched-for node.

When the second node ID "PO0001N01" is registered in the search list as a yet-to-be searched for node, no other node ID than the node ID "PO0001N01" is registered. Thus, the node ID "PO0001N01" is selected, and the searching is continued.

In this example, the second node ID is not a blank. If the second node ID is a blank, a yet-to-be-searched-for branch registered in the search list is searched for. If no yet-to-be-searched-for branch is present, a yet-to-be-searched-for node is searched for. If no yet-to-be-searched-for position ID of SS is present, the searching is terminated. In this example, the branch is not a switch. If the branch is a switch and the switch is not in the closed state, neither retrieval of the second node ID nor addition of the second node to the search list is performed. If the switch is in the open state and retrieval of the second node ID and addition of the second node to the search list are performed, a different distribution system not electrically connected is erroneously registered in the current node table 17a and the current branch table 17b.

The searching described above retrieves nodes of distribution systems whose facilities are electrically connected when the searching is performed on the branches registered in the node table 16a, thereby generating the current node table 17a. The searching also retrieves branches of distribution systems electrically connected when the searching is performed on the branches registered in the branch table 16b and attribute information corresponding to the branches. This generates the current branch table 17b in which the branches and the attribute information are associated with each other. In the description below, the distribution systems whose facilities are electrically connected when the searching is performed may be referred to as a "current system".

The distribution system information 17 includes the current node table 17a and the current branch table 17b generated as described above, and is registered in the storage unit 13. FIG. 9 is an example diagram of the current node table 17a. FIG. 10 is an example diagram of the current branch table 17b. FIG. 9 and FIG. 10 illustrate the current node table 17a and the current branch table 17b, respectively. These tables 17a and 17b are generated based on the tables illustrated in FIG. 4 to FIG. 8 using the node ID "SS0001N01" as an origin.

Nodes "LL0001N01", "LL0002N01", "LL0003N01", "LL0004N01", "LL0005N01", "LL0006N01", "LL0007N01", and "LL0008N01" are connections of the load facility of the consumer and the facility of the distribution system. As illustrated in FIG. 9, the records of these nodes out of the records in the current node table 17a have the amount of power consumption measured by a meter, such as a smart meter, as an example of the attribute information. The amount of power consumption includes "active power" consumed by the load facilities and "reactive power" not consumed by the load facilities. The reactive power is also referred to as delay reactive power. The amount of power consumption (active) and the amount of power consumption (reactive) are referred to in calculation of a voltage at each node.

As illustrated in FIG. 10, records of facilities serving as a switch in the branch out of the records in the current branch table 17b each have the value of the open-close section registered in the branch table 16b. The switches of the branch IDs "BR0002", "BR0006", and "BR0019", for example, have "1" in the open-close section. This indicates that the switch is in the closed state and establishes electrical continuity. FIG. 10 illustrates the switches having "1" in the open-close section, for example. By contrast, "0" set in the open-close section of a switch indicates that the switch is in the open state and breaks electrical continuity. The records in the current branch table 17b each have a reactance X and a resistance R as an example of the attribute information. Facilities serving as a unit in the branch, such as a switch and a transformer, each have the reactance X and the resistance R registered in the unit table 15a without any change as the attribute information. By contrast, facilities serving as a span in the branch each have a value obtained by multiplying the reactance per unit by the span length registered in the span table 15b as the reactance X and have a value obtained by multiplying the resistance per unit by the span length as the resistance R. The reactance X and the resistance R of the unit and the span are referred to in calculation of a voltage at each node.

In this example, various types of parameters are used to calculate a voltage, including the amount of power consumption (active), the amount of power consumption (reactive), the resistance, and the reactance. By adding an item of a connection phase to which the transformer is connected to one of the current node table 17a and the current branch table 17b, it is possible to calculate a voltage more precisely. In the case of an electric wire serving as a single phase three-wire, for example, a first transformer connected to the wire on the pole is referred to as a "first connection phase", a second transformer is referred to as a "second connection phase", and a third transformer is referred to as a "third connection phase". When a transformer is connected to the first and the second electric wires of the three electric wires, "A" is registered. When a transformer is connected to the second and the third electric wires, "B" is registered. When a transformer is connected to the first and the third electric wires, "C" is registered.

Figure 11:
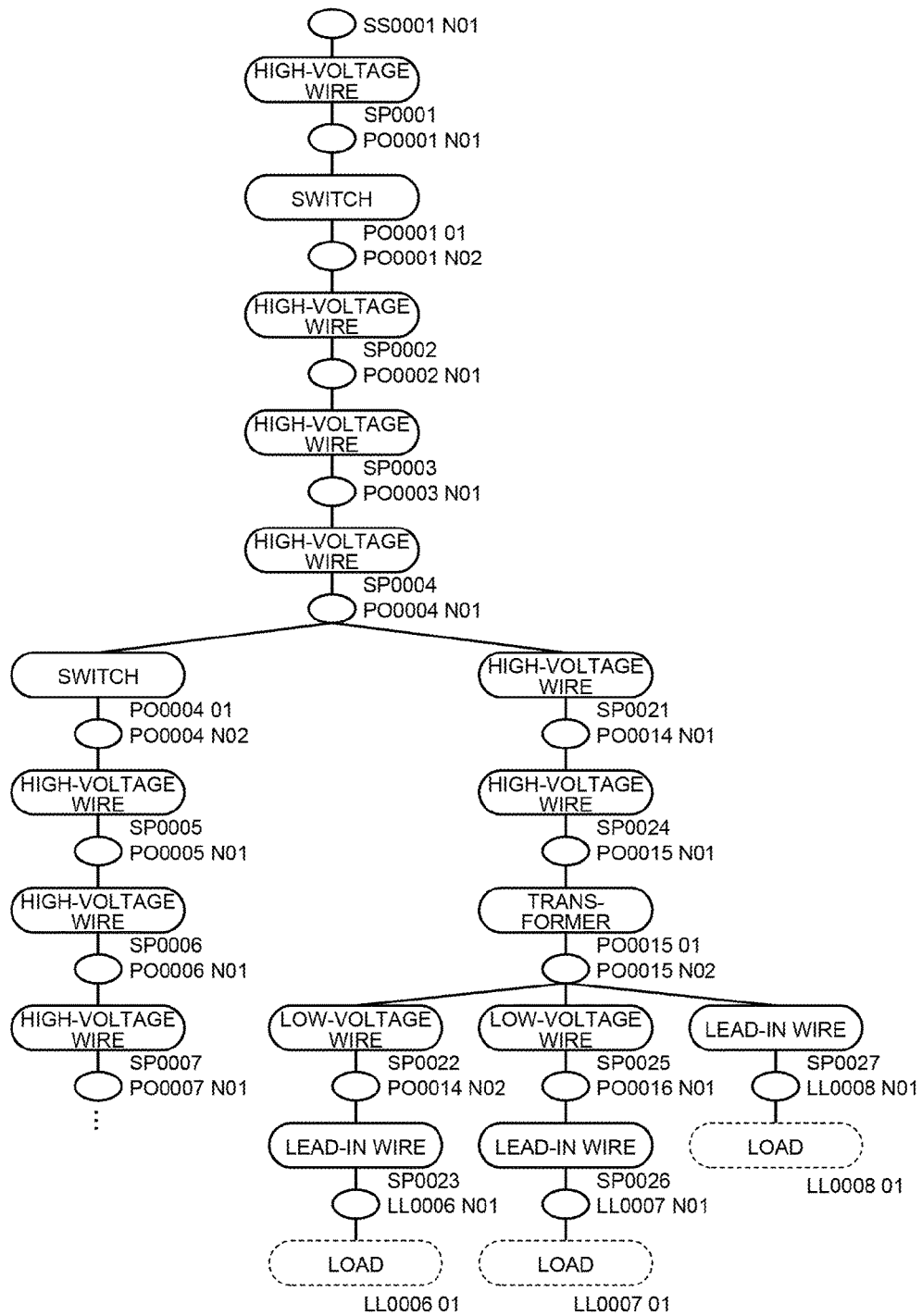
FIG. 11 is a first example diagram of a graph structure of a distribution system.
Figure 12:
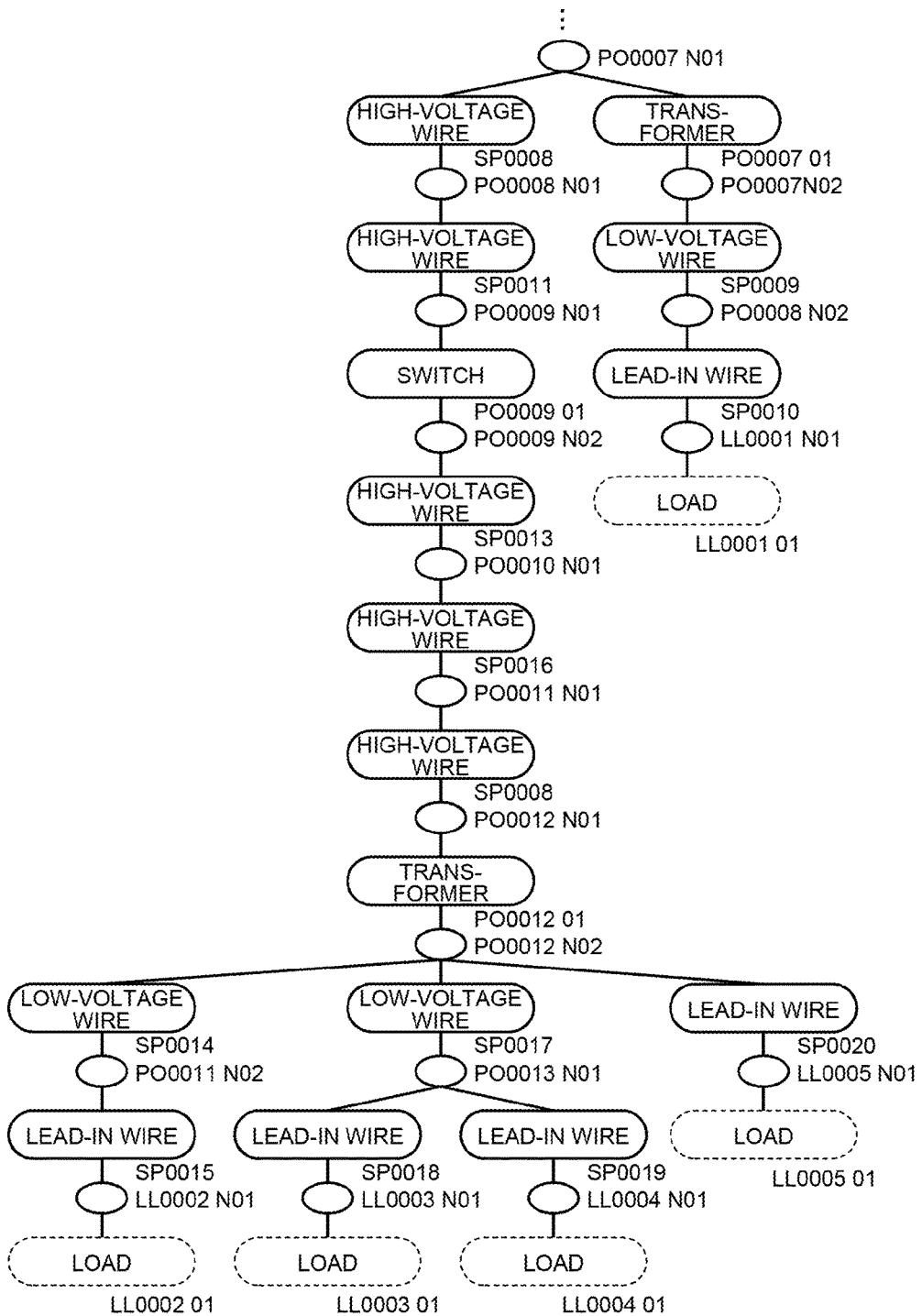
FIG. 12 is a second example diagram of the graph structure of the distribution system.

The distribution system information 17 is generated based on the current node table 17a illustrated in FIG. 9 and the current branch table 17b illustrated in FIG. 10, and has a graph structure of the distribution system illustrated in FIG. 11 and FIG. 12. FIG. 11 and FIG. 12 are example diagrams of the graph structure of the current system. The current system illustrated in FIG. 11 and FIG. 12 includes the node of the node ID "SS0001N01" serving as a connection of an SS bank and a high-voltage wire of the facility ID "SP0001" at a root (a first layer) of the hierarchical structure. The current system further includes paths extending from the root to eight load facilities of facility IDs "LL000101", "LL000201", "LL000301", "LL000401", "LL000501", "LL000601", "LL000701", and "LL000801" serving as ends. The number of layers from the SS bank to the load facility of the facility ID "LL000801" is 10, and thus the load facility "LL000801" is positioned at the shallowest layer. The number of layers from the SS bank to the load facilities of the facility IDs "LL000201", "LL000301", and "LL000401" is 19, and thus the load facilities "LL000201", "LL000301", and "LL000401" are positioned at the deepest layer. Generating the distribution system information 17 makes it possible to grasp the electrical connection of the current system not in rough units, such as a high-voltage system and a low-voltage system, but in units of facilities, more specifically, in units of connections between the facilities in a minute manner.

Referring back to FIG. 1, the acquiring unit 19c is a processing unit that acquires load information on a power consumption facility. The acquiring unit 19c, for example, acquires the amount of power consumption of the smart meter 50 as the load information on the power consumption facility. An aspect of the acquiring unit 19c acquires the amount of power consumption updated by the smart meter 50 connected to the load facility of each consumer. The acquiring unit 19c then additionally registers a record in which the facility ID of the load facility to which the smart meter 50 is connected, the date and time of updating, and the amount of power consumption are associated with one another to a load table 18a in the load information 18. An assumption is made that each smart meter 50 updates the amount of power consumption every predetermined period (e.g., every 30 minutes). The load table 18a stores therein the load information on the power consumption facility acquired every predetermined period. The load table 18a, for example, registers therein the record on a cycle of a time corresponding to the sum of an interval of meter reading to cause the smart meter 50 to transmit the reading result of the amount of power consumption and a transmission delay time between the smart meter 50 and the loss calculating device 10 for each smart meter 50.

The following describes an example of the load information 18 stored in the storage unit 13. The load information 18 may have the load table 18a in which items including the facility ID, a date, time, and the amount of power consumption are associated with one another. FIG. 13 is an example diagram of the load table 18a. FIG. 13 indicates that the smart meter 50 connected to a load facility of a facility ID "LL1" uploads an amount of power consumption U11 at 14:40:18 on Sep. 5, 2012 and an amount of power consumption U12 at 15:10:19. FIG. 13 illustrates examples of load facilities independent of the facilities illustrated in the unit table 15a in FIG. 5 for convenience of explanation.

The first calculating unit 19d is a processing unit that calculates a load current of each distribution facility. The first calculating unit 19d calculates a voltage at each current node. In one aspect, the first calculating unit 19d starts processing for calculating a voltage at each current node from a current node included in a substation toward a current node included in a load facility side in each distribution system, when a history relating to the amount of power consumption uploaded by the smart meter 50 is updated, in the load table 18a.

Specifically, the first calculating unit 19d reads information used to calculate the voltage from the current branch table 17b. The first calculating unit 19d acquires a voltage of electric power transmitted from the substation, a voltage ratio of a transformer, and a resistance and a reactance of an electric wire, for example. In the description below, the voltage of the electric power transmitted from the substation may be referred to as a "sending voltage". The first calculating unit 19d further reads the amount of power consumption in the load facility of each consumer from the load table 18a. When the amount of power generation exceeds the amount of power consumption, for example, the amount of power consumption may possibly have a negative value. When the amount of power consumption has a negative value, a reverse power flow occurs. The reverse power flow is a phenomenon of electric power generated by a power generation facility of the consumer flowing from load facility side toward the distribution system. In this case, the electric power supplier purchases the electric power from the consumer.

The first calculating unit 19d calculates the voltage at each current node using the parameters, such as the sending voltage of the substation, the voltage ratio of the transformer, the resistance and the reactance of the electric wire, and the amount of power consumption of the load facility. Examples of the method for calculating the voltage include a known algorithm, such as backward-forward sweep (BFS) and a Newton-Raphson method. If the BFS is employed, for example, sequential calculation from load facilities (to substation) and modification from the substation are alternately made using the characteristics of the distribution system being radially arranged, thereby calculating the voltage at each current node. This operation calculates the voltage at each current node of the end included in load facilities of customers.

The first calculating unit 19d then calculates a load current of each distribution facility. The first calculating unit 19d, for example, calculates an electric current flowing through a distribution facility, such as a high-voltage wire, a transformer, a low-voltage wire, and a lead-in wire, based on a voltage at a current node corresponding to the distribution facility and a resistance and a reactance of the distribution facility.

The second calculating unit 19e is a processing unit that calculates the amount of power loss in each distribution facility. The second calculating unit 19e, for example, calculates the amount of power loss in each distribution facility based on the load information 18 of each distribution facility and the load current of each distribution facility calculated by the first calculating unit 19d. The second calculating unit 19e, for example, multiplies the resistance R of a distribution facility by the square of an electric current value I of an electric current flowing through the distribution facility ($R \times I^2$), thereby deriving the amount of power loss in the distribution facility. The second calculating unit 19e makes the same calculation in the case of a reverse power flow, for example.

Figure 14:
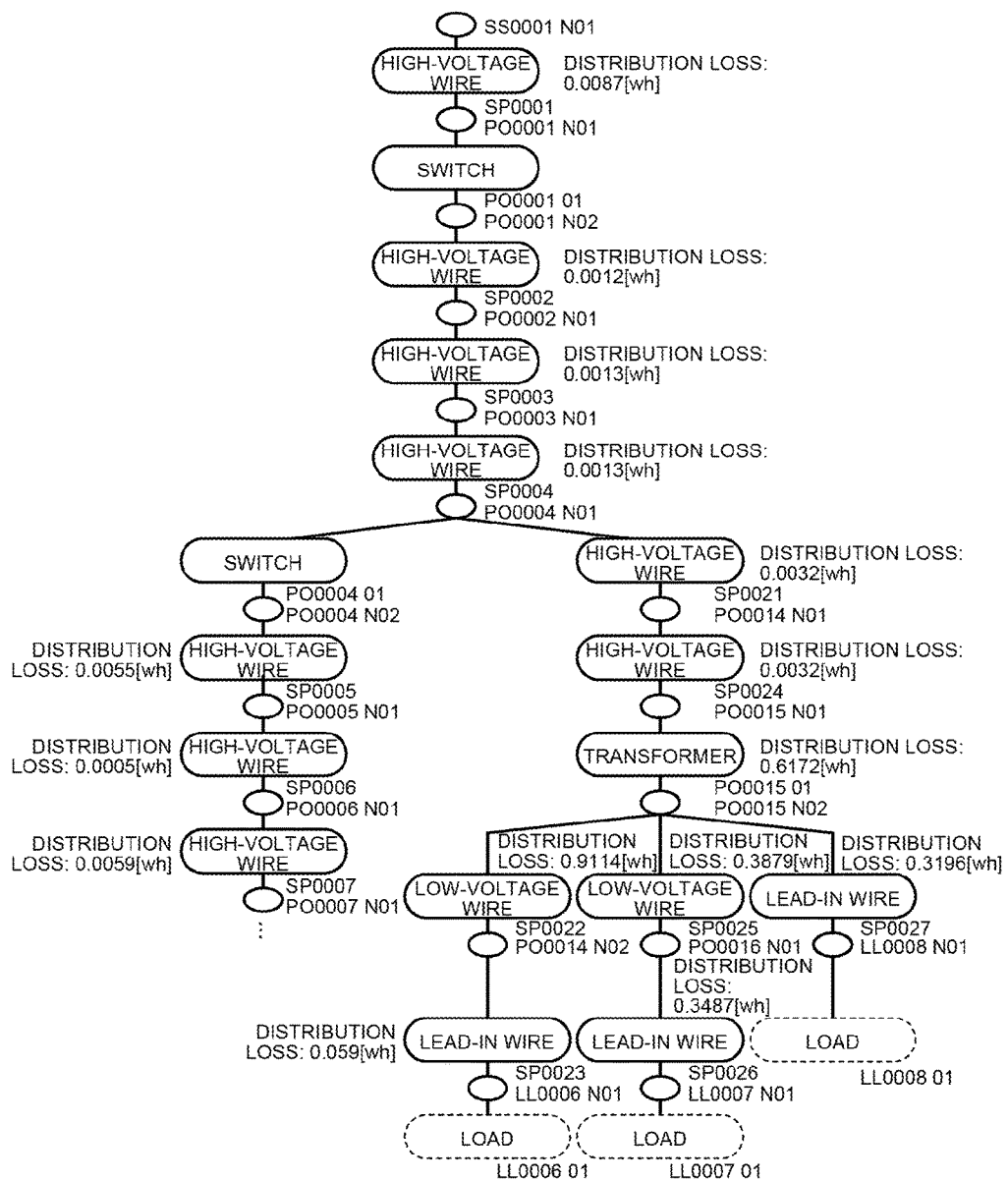
FIG. 14 is an example diagram of the amount of power loss in a current system.
Figure 15:
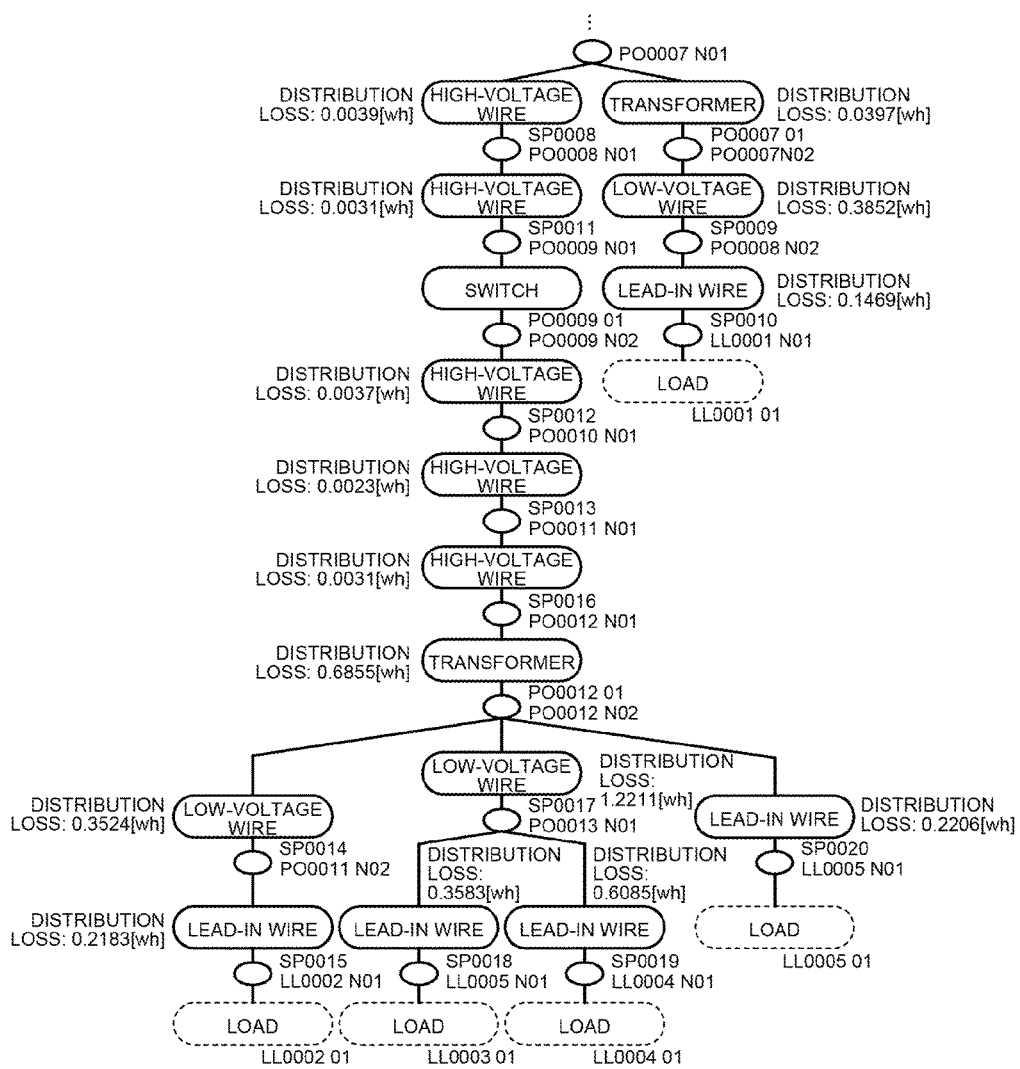
FIG. 15 is an example diagram of the amount of power loss in the current system.

FIG. 14 and FIG. 15 are example diagrams of the amount of power loss in the current system. FIG. 14 and FIG. 15 illustrate the amount of power loss in each distribution facility of the distribution system illustrated in FIG. 11 and FIG. 12, respectively, as a distribution loss. The example in FIG. 14 indicates that the high-voltage wire of the facility ID "SP0001" generates power loss of 0.0087 Wh. The example in FIG. 15 indicates that the lead-in wire of the facility ID "SP0015" generates power loss of 0.2183 Wh. Thus, the loss calculating device 10 can grasp the power loss in units of distribution facilities.

The load information on the power consumption facility is acquired every predetermined period. The first calculating unit 19d and the second calculating unit 19e calculate, every predetermined period, the amount of power loss in each distribution facility using the load information on the power consumption facilities acquired in the predetermined period. In one aspect, the first calculating unit 19d and the second calculating unit 19e start the processing every time the predetermined period has passed since the end of the previous calculation of the amount of power loss, thereby calculating the amount of power loss in each distribution facility. The second calculating unit 19e stores the amount of power loss calculated for each distribution facility and date and time information on the predetermined period for the calculation in the storage unit 13 as the power loss amount information 20.

The totalizing unit 19f is a processing unit that performs various types of totalization of the amount of power loss in each predetermined period stored in the power loss amount information 20. When a display condition is specified on a specification screen used to specify the display condition of power loss, which will be described later, for example, the totalizing unit 19f totalizes the amount of power loss under the specified display condition.

When any one of the nodes is specified, for example, the totalizing unit 19f totalizes the amount of power loss in each predetermined period in distribution facilities positioned at layers of and below the specified node every predetermined period. When totalization in units of the types of tine distribution facilities is specified, for example, the totalizing unit 19f totalizes the amount of power loss in each predetermined period in each distribution facility in units of the predetermined period and the types of the distribution facilities. In one aspect, the totalizing unit 19f totalizes the amount of power loss in each predetermined period in units of the types of the distribution facilities, such as the high-voltage wires, the transformers, the low-voltage wires, and the lead-in wires. When calculation of the sum of the amount oil power loss in each predetermined period is specified, for example, the totalizing unit 19f calculates the sum of the amount of power loss in each predetermined period. The totalizing unit 19f, for example, calculates the sum of the amount of power loss in a predetermined totalization period longer than the predetermined period in units of the types of the distribution facilities. In one aspect, the totalizing unit 19f calculates the sum of the amount of power loss per day in units of the types of the distribution facilities, such as the high-voltage wires, the transformers, the low-voltage wires, and the lead-in wires.

The display control unit 19g is a processing unit that performs display control on the client terminal 30. The display control unit 19g, for example, displays the specification screen used to specify various types of display conditions under which the power loss is displayed on the client terminal 30. The display control unit 19g displays the amount of power loss on the client terminal 30 according to the condition specified on the specification screen.

When a certain period and a distribution facility for which the amount of power loss is to be displayed are specified, for example, the display control unit 19g reads the amount of power loss in the specified period and in the specified distribution facility from the power loss amount information 20. The display control unit 19g then displays the amount of power loss on the client terminal 30. When the client terminal 30 instructs display of the amount of power loss while specifying a node, for example, the display control unit 19g displays the amount of power loss in each predetermined period in nodes positioned at layers of and below the specified node, which the amount of power loss is totalized by the totalizing unit 19f. In one aspect, the display control unit 19g displays the amount of power loss in each predetermined period in the distribution facilities on a graph.

Figure 16:
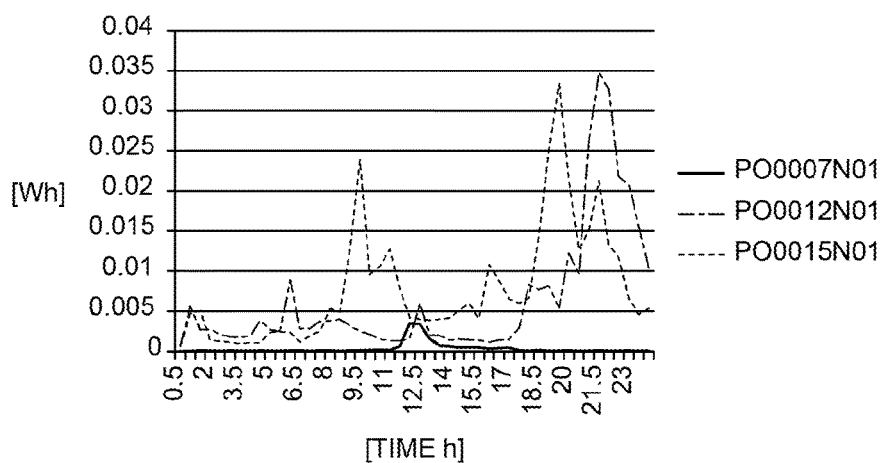
FIG. 16 is an example graph of the amount of power loss in each predetermined period in specified facilities.

FIG. 16 is an example graph of the amount of power loss in each predetermined period in specified facilities. The example in FIG. 16 illustrates the amount of power loss in each predetermined period in the facilities of the facility IDs "PO0007 01", "PO0012 01", and "PO0015 01". By displaying the amount of power loss in each predetermined period on a graph, it is possible to grasp a temporal change in the amount of power loss and a peak and the state of the amount of power loss.

When totalization in units of the types of the distribution facilities is specified, for example, the display control unit 19g displays the amount of power loss in each predetermined period totalized by the totalizing unit 19f in units of the types of the distribution facilities. An aspect of the display control unit 19g displays the amount of power loss in each predetermined period in units of the types of the distribution facilities, such as the high-voltage wires, the transformers, the low-voltage wires, and the lead-in wires, on a graph.

Figure 17:
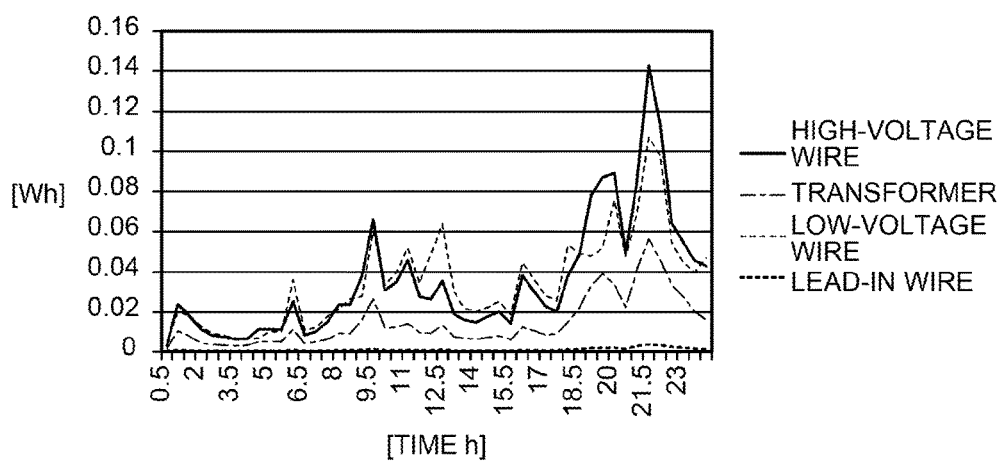
FIG. 17 is an example graph of the amount of power loss in each predetermined period in units of the types of distribution facilities.

FIG. 17 is an example graph of the amount of power loss in each predetermined period in units of the types of the distribution facilities. The example in FIG. 17 illustrates the amount of power loss in each predetermined period in the high-voltage wires, the transformers, the low-voltage wires, and the lead-in wires. By displaying the amount of power loss in each predetermined period in units of the types of the distribution facilities, it is possible to grasp a temporal change in the amount of power loss in units of the types of the distribution facilities.

When calculation of the sum of the amount of power loss in each predetermined period is specified, for example, the display control unit 19g displays the sum of the amount of power loss in the totalization period, which the amount of power loss is totalized by the totalizing unit 19f in units of the types of the distribution facilities. In one aspect, the display control unit 19g displays the sum of the amount of power loss per day in units of the types of the distribution facilities, such as the high-voltage wires, the transformers, the low-voltage wires, and the lead-in wires, on a pie chart.

Figure 18:
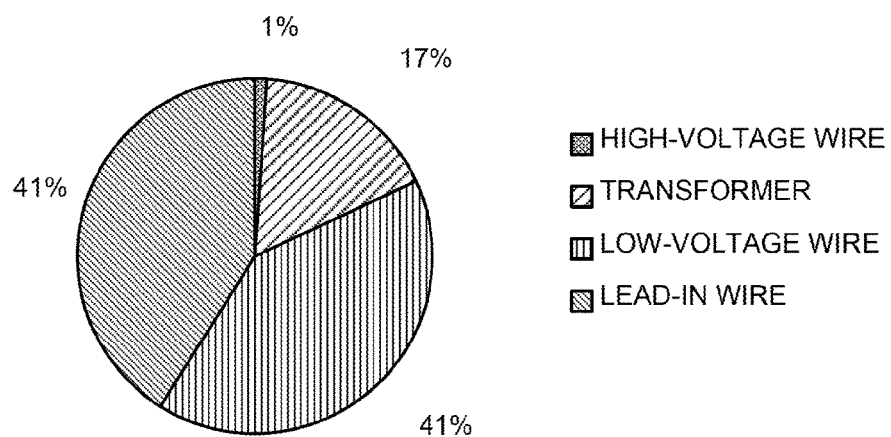
FIG. 18 is an example pie chart of the amount of power loss per day in units of the types of the distribution facilities.

FIG. 18 is an example pie chart of the amount of power loss per day in units of the types of the distribution facilities. The example in FIG. 18 illustrates the amount of power loss in each predetermined period in the high-voltage wires, the transformers, the low-voltage wires, and the lead-in wires in total. By displaying the amount of power loss in each predetermined period in units of the types of the distribution facilities in total, it is possible to grasp which type of the distribution facility has a large amount of power loss.

While the display control unit 19g displays various types of information on the client terminal 30 in the present embodiment, the display control unit 19g may display the information on a display unit included in the loss calculating device 10 and other devices.

The control unit 19 may be various types of circuits, including integrated circuits and electronic circuits. A part of the functional units included in the control unit 19 may be other integrated circuits or electronic circuits. Examples of the integrated circuits include an application specific integrated circuit (ASIC). Examples of the electronic circuits include a central processing unit (CPU) and a micro processing unit (MPU).

Procedure of Processing

The following describes the procedure of processing performed by the loss calculating device 10 according to the present embodiment. The explanation will be made of distribution management processing first and then loss calculation processing performed by the loss calculating device 10.

(1) Distribution Management Processing

Figure 19:
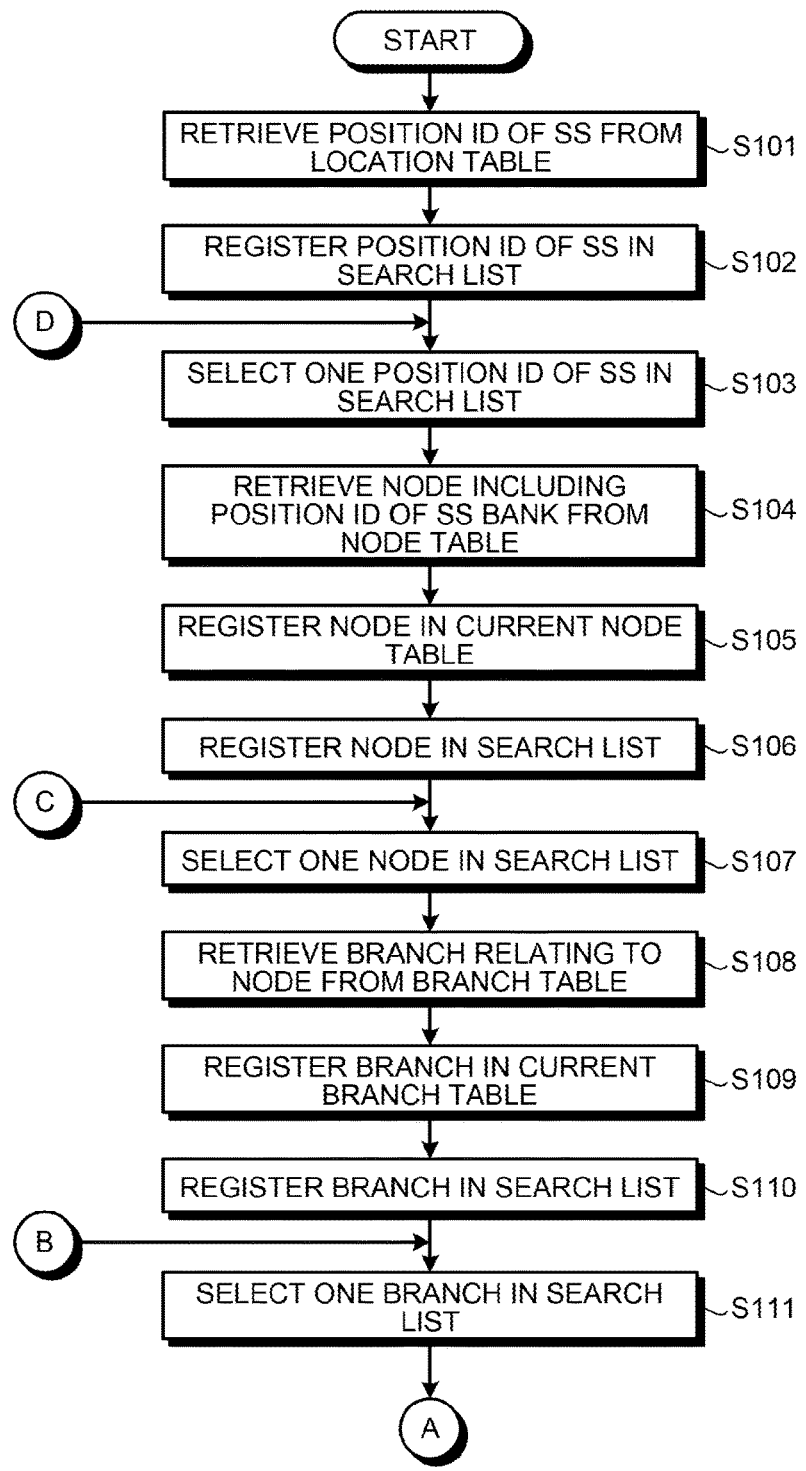
FIG. 19 is a flowchart of distribution management processing according to the first embodiment.
Figure 20:
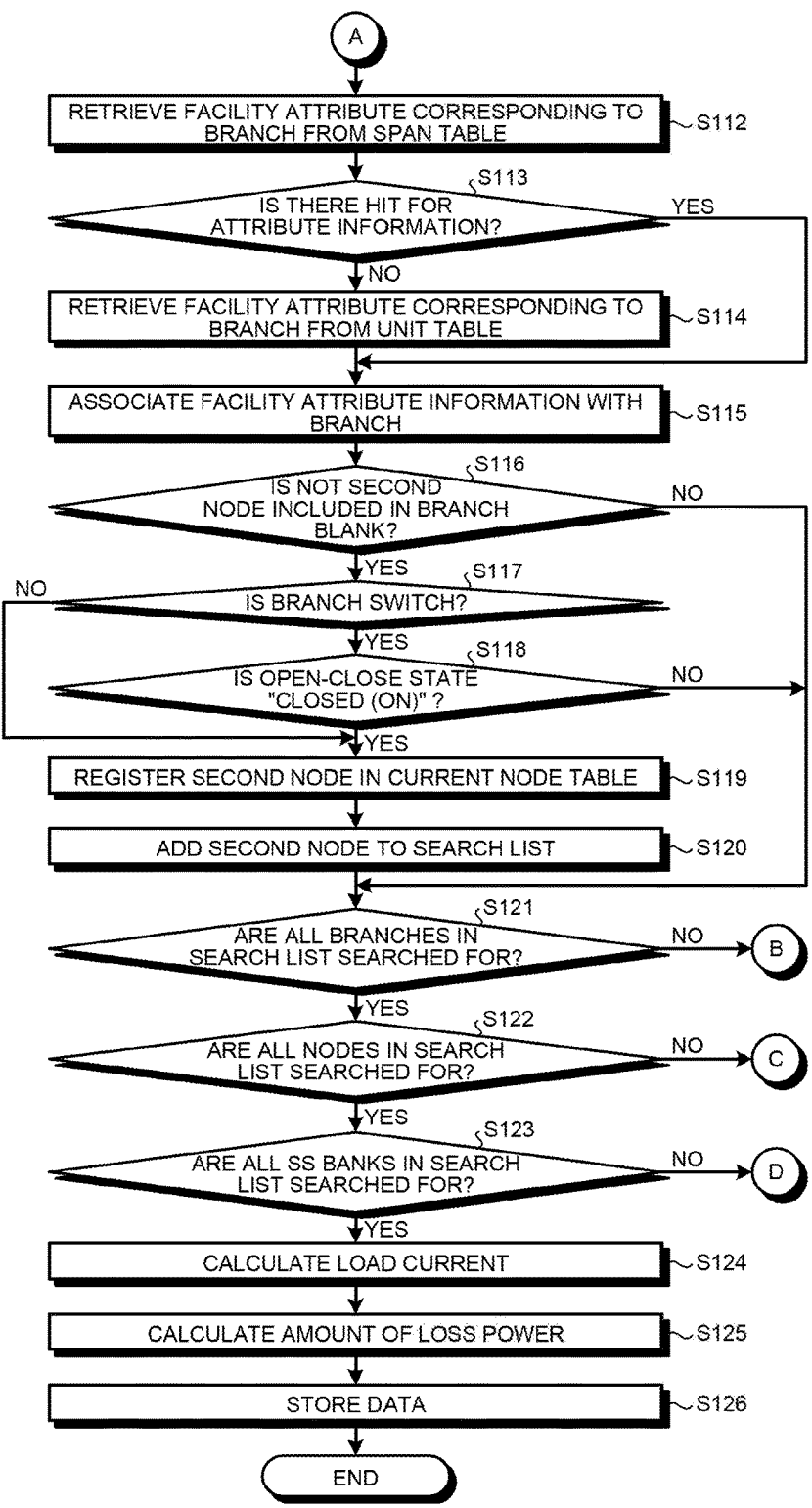
FIG. 20 is a flowchart Of the distribution management processing according to the first embodiment.

FIG. 19 and FIG. 20 are flowcharts of the distribution management processing according to the first embodiment. The distribution management processing is started at a predetermined timing, specifically, when a distribution facility of the distribution system is installed or when a browsing request for the amount of power loss is received via the client terminal 30, for example.

As illustrated in FIG. 19, the retrieval unit 19a retrieves a position ID whose position type is a substation "SS" out of the position IDs stored in the location table 14a (Step S101).

The retrieval unit 19a registers the position ID of SS retrieved from the location table 14a in the search list (Step S102).

Subsequently, the retrieval unit 19a selects one position ID of SS registered in the search list (Step S103). The retrieval unit 19a retrieves a node corresponding to the selected position ID of SS from the nodes stored in the node table 16a (Step S104).

The retrieval unit 19a registers the record of the node retrieved from the node table 16a in the current node table 17a stored in the storage unit 13 as the distribution system information 17 (Step S105). The retrieval unit 19a also registers the node retrieved from the node table 16a in the search list (Step S106).

Subsequently, the retrieval unit 19a selects one node registered in the search list (Step S107). The retrieval unit 19a retrieves a combination of node IDs including the node selected at Step S107 from the branches stored in the branch table 16b, that is, a record of a branch including a combination of a node $ID_1$ and a node $ID_2$ (Step S108).

The retrieval unit 19a registers the record of the branch retrieved at Step S108 in the current branch table 17b (Step S109). The retrieval unit 19a also registers the branch retrieved at Step S108 in the search list (Step S110). Subsequently, the retrieval unit 19a selects one branch registered in the search list (Step S111).

The retrieval unit 19a retrieves attribute information corresponding to the facility ID of the branch selected at Step S111 from the span table 15b as illustrated in FIG. 20 (Step S112). If the retrieval unit 19a fails to retrieve the attribute information from the span table 15b, or if there is no hit for the attribute information (No at Step S113), the retrieval unit 19a performs the following processing.

Specifically, the retrieval unit 19a retrieves the attribute information corresponding to the facility ID of the branch selected at Step S111 from the unit table 15a (Step S114). If the retrieval unit 19a can retrieve the attribute information from the span table 15b (Yes at Step S113), the processing at Step S114 is skipped, and the process proceeds to Step S115.

The associating unit 19b registers the attribute information on the branch in a manner associated with the record of the branch used to search the span table 15b or the unit table 15a out of the records stored in the current branch table 17b (Step S115).

The retrieval unit 19a determines whether a second node making a pair with the node used for the searching at Step S108 in the combination of nodes included in the branch retrieved at Step S108 is a blank (Step S116).

If the second node is not a blank (Yes at Step S116), the retrieval unit 19a determines whether the branch is a switch (Step S117). If the branch is a switch (Yes at Step S117), the retrieval unit 19a determines whether the switch is in the closed state, that is, whether the switch is in an ON state (Step S118).

If the switch is in the ON state (Yes at Step S118), the retrieval unit 19a retrieves the record of the second node from the node table 16a and registers the record in the current node table 17a in the distribution system information 17 (Step S119). The retrieval unit 19a adds the second node to the search list as a yet-to-be-searched-for node (Step S120).

If the branch is not a switch (No at step S117), the retrieval unit 19a also retrieves the record of the second node from the node table 15a and registers the record in the current node table 17a in the distribution system information 17 (Step S119). The retrieval unit 19a adds the second node to the search list as a yet-to-be-searched-for node (Step S120).

By contrast, if the second node is a blank or the switch is in an OFF state (No at Step S116 or No at Step S118), the process proceeds to Step S121.

Subsequently, the retrieval unit 19a determines whether all the branches registered in the search list are searched for (Step S121). If all the branches registered in the search list are not searched for (No at Step S121), a yet-to-be-searched-for branch is selected (Step S111), and the processing from Step S112 to Step S120 is repeated.

If all the branches registered in the search list are searched for (Yes at Step S121), the retrieval unit 19a determines whether all the nodes registered in the search list are searched for (Step S122). If all the nodes registered in the search list are not searched for (No at Step S122), a yet-to-be-searched-for node is selected (Step S107), and the processing from Step S108 to Step S121 is repeated.

If all the nodes registered in the search list are searched for (Yes at Step S122), the retrieval unit 19a determines whether all the position IDs of SS registered in the search list are searched for (Step S123). If all the position IDs of SS registered in the search list are not searched for (No at Step S123), a yet-to-be-searched-for position ID of SS is selected (Step S103), and the processing from Step S104 to Step S122 is repeated.

If all the position IDs of SS registered in the search list are searched for (Yes at Step S123), the first calculating unit 19d calculates a load current of each distribution facility (Step S124). The first calculating unit 19d, for example, calculates a voltage at each current node toward a current node using a sending voltage of electric power transmitted from the substation and the amount of power consumption in the load facility of each consumer read from the load table 18a. Thus, the first calculating unit 19d calculates the load current of each distribution facility. The second calculating unit 19e calculates the amount of power loss in each distribution facility based on the load information on each distribution facility and the load current calculated for each distribution facility (Step S125). The second calculating unit 19e stores the amount of power loss calculated for each distribution facility and date and time information on the predetermined period for the calculation in the storage unit 13 as the power loss amount information 20 (Step S126). The processing is then terminated.

(2) Loss Calculation Processing

Figure 21:
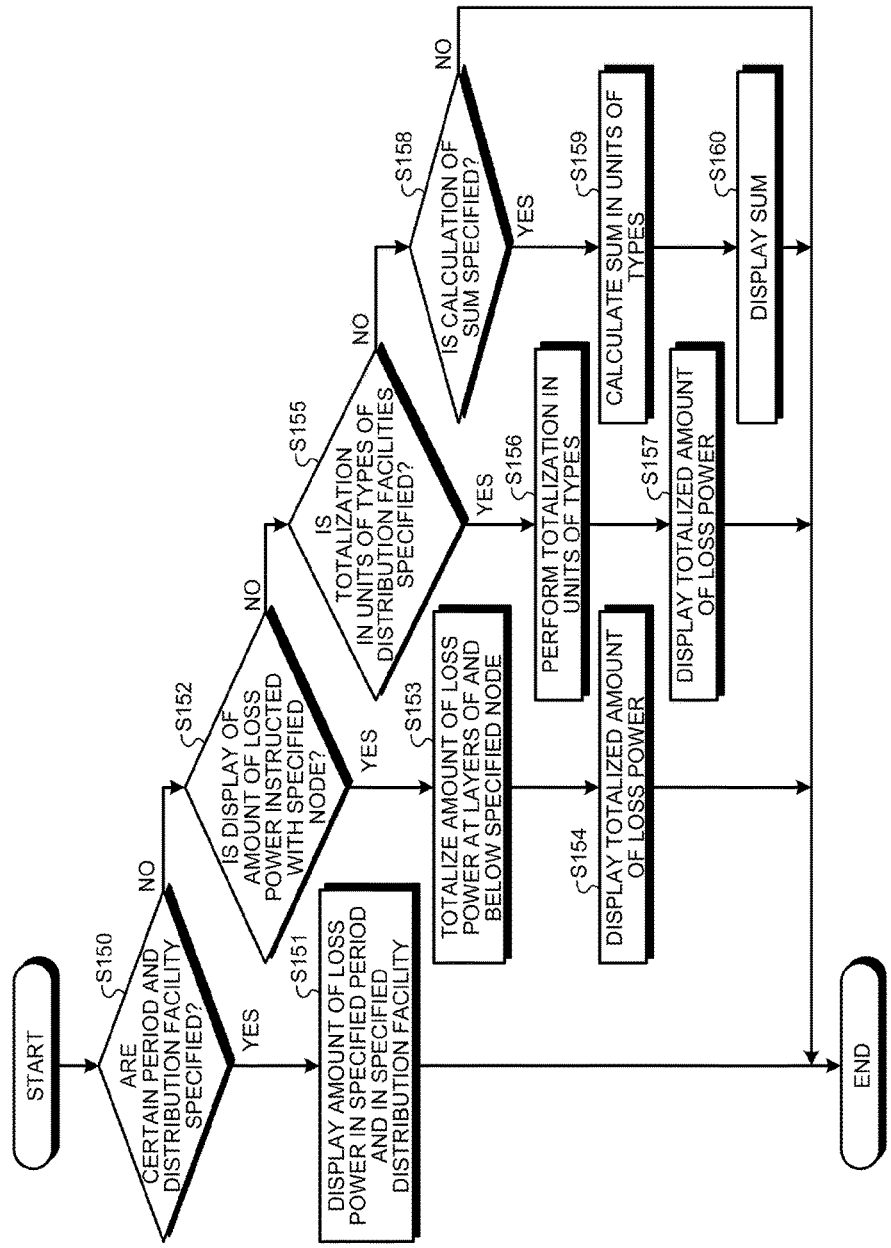
FIG. 21 is a flowchart of loss calculation processing according to the first embodiment.

FIG. 21 is a flowchart of the loss calculation processing according to the first embodiment. The display control processing is performed when a display condition is specified on a specification screen used to specify the display condition of power loss displayed on the client terminal 30, for example.

As illustrated in FIG. 21, the totalizing unit 19f determines whether a certain period and a distribution facility for which the amount of power loss is to be displayed are specified on the specification screen (Step S150). If a certain period and a distribution facility for which the amount of power loss is to be displayed are specified (Yes at Step S150), the display control unit 19g reads the amount of power loss in the specified period and in the specified distribution facility from the power loss amount information 20, and displays the amount of power loss on the client terminal 30 (Step S151). The processing is then terminated.

By contrast, if no certain period or no distribution facility for which the amount of power loss is to be displayed is specified (No at Step S150), the totalizing unit 19f determines whether display of the amount of power loss is instructed with a specified node (Step S152). If display of the amount of power loss is instructed with a specified node (Yes at Step S152), the totalizing unit 19f totalizes the amount of power loss in each predetermined period in the distribution facilities positioned at layers of and below the specified node every predetermined period (Step S153). The display control unit 19g displays the amount of power loss totalized every predetermined period for the specified node (Step S154). The processing is then terminated.

By contrast, if display of the amount of power loss is not instructed with a specified node (No at Step S152), the totalizing unit 19f determines whether totalization in units of the types of the distribution facilities is specified (Step S155). If the totalization in units of the types of the distribution facilities is specified (Yes at Step S155), the totalizing unit 19f totalizes the amount of power loss in each predetermined period in each distribution facility in units of the predetermined period and the types of the distribution facilities (Step S156). The display control unit 19g displays the amount of power loss in each predetermined period totalized in units of the types of the distribution facilities (Step S157). The processing is then terminated.

By contrast, if the totalization in units of the types of the distribution facilities is not specified (No at Step S155), the totalizing unit 19f determines whether calculation of the sum of the amount of power loss in each predetermined period is specified (Step at S158). If calculation of the sum of the amount of power loss in each predetermined period is specified (Yes at Step at S158), the totalizing unit 19f calculates the sum of the amount of power loss in a predetermined totalization period in units of the types of the distribution facilities (Step S159). The display control unit 19g displays the sum of the amount of power loss in the totalization period totalized in units of the types of the distribution facilities (Step S160). The processing is then terminated.

Advantageous Effects of the First Embodiment

As described above, the loss calculating device 10 according to the present embodiment calculates a load current of each distribution facility based on a sending voltage in a power source facility and load information on power consumption facilities in an electrical circuit including the power source facility, the distribution facilities, and the power consumption facilities connected to one another to form the electrical circuit. Based on the load current calculated for each distribution facility, the loss calculating device 10 calculates the amount of power loss in each distribution facility. Thus, the loss calculating device 10 according to the present embodiment can grasp the distribution loss in each distribution facility.

The loss calculating device 10 acquires the load information on the power consumption facilities every predetermined period. The loss calculating device 10 calculates the load current of each distribution facility in each predetermined period based on the sending voltage in the power source facility and the load information on the power consumption facilities acquired every predetermined period. The loss calculating device 10 uses the load current in each predetermined period calculated for each distribution facility, thereby calculating the amount of power loss in each predetermined period in each distribution facility. Thus, the loss calculating device 10 according to the present embodiment can grasp the distribution loss in each predetermined period in each distribution facility.

The loss calculating device 10 totalizes the amount of power loss in each predetermined period calculated for each distribution facility in units of the predetermined period and the types of the distribution facilities. The loss calculating device 10 displays the amount of power loss totalized in units of the predetermined period and the types of the distribution facilities. Thus, the loss calculating device 10 according to the present embodiment can grasp the distribution loss in units of the predetermined period and the types of the distribution facilities.

The loss calculating device 10 calculates the sum of the amount of power loss in each predetermined period calculated for each distribution facility in units of the types of the distribution facilities. The loss calculating device 10 displays the sum of the amount of power loss calculated in units of the types of the distribution facilities. Thus, the loss calculating device 10 according to the present embodiment can grasp the sum of the distribution loss in units of the types of the distribution facilities.

[b] Second Embodiment

Configuration of a Loss Calculating Device

Figure 22:
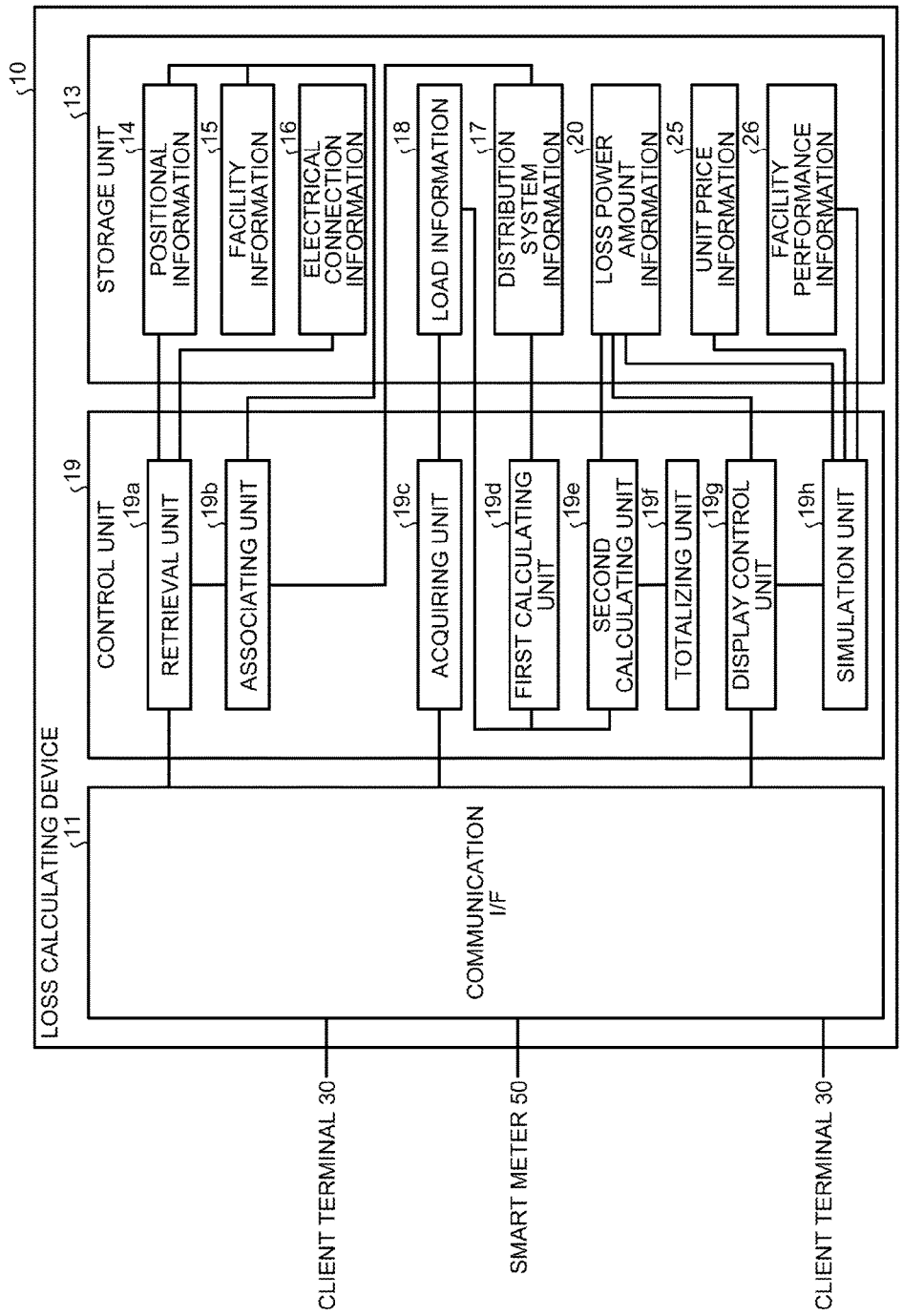
FIG. 22 is a block diagram of a functional configuration of a loss calculating device according to a second embodiment of the present invention.

A second embodiment according to the present invention will be described. FIG. 22 is a block diagram of a functional configuration of a loss calculating device 10 according to the second embodiment. The configuration of the loss calculating device 10 according to the second embodiment is nearly the same as that of the first embodiment. Components similar to those of the first embodiment are denoted by like reference numerals, and the explanation will be mainly made of different parts.

As illustrated in FIG. 22, a storage unit 13 of the loss calculating device 10 according to the second embodiment stores therein unit price information 25 and facility performance information 26.

The unit price information 25 is data storing therein a unit price used to convert electric power into an amount of money. The unit price information 25, for example, stores therein a unit price per predetermined unit of electric power.

FIG. 23 is an example diagram of the unit price information 25. The unit price information 25 illustrated in FIG. 23 stores therein 18 yen as a unit price per 1 kWh, for example.

The facility performance information 26 is data storing therein various types of information on various types of distribution facilities. The facility performance information 26, for example, stores therein information on the performance of a distribution facility and the unit price of the distribution facility.

FIG. 24 is an example diagram of the facility performance information 26. The facility performance information 26 illustrated in FIG. 24 stores therein information on transformers having different transformer capacities as distribution facilities. The facility performance information 26 indicates that the unit price of a transformer of 30 kVA is 160,000 yen and that the unit price of a transformer of 10 kVA is 120,000 yen, for example. The facility performance information 26 may also store therein various types of information on electrical characteristics and performance of the facilities. The facility performance information 26 may store therein the capacity of the transformers, for example.

A second calculating unit 19e calculates a loss price due to the amount of power loss in each distribution facility based on the amount of power loss in each distribution facility. The second calculating unit 19e, for example, multiplies the amount of power loss by the unit price of electric power stored in the unit price information 25 for each distribution facility, thereby deriving the loss price.

A display control unit 19g displays the calculated loss price when displaying the amount of power loss. The display control unit 19g, for example, displays the amount of power loss in each predetermined period in units of the types of the distribution facilities, such as high-voltage wires, transformers, low-voltage wires, and lead-in wires, as the loss price.

Figure 25:
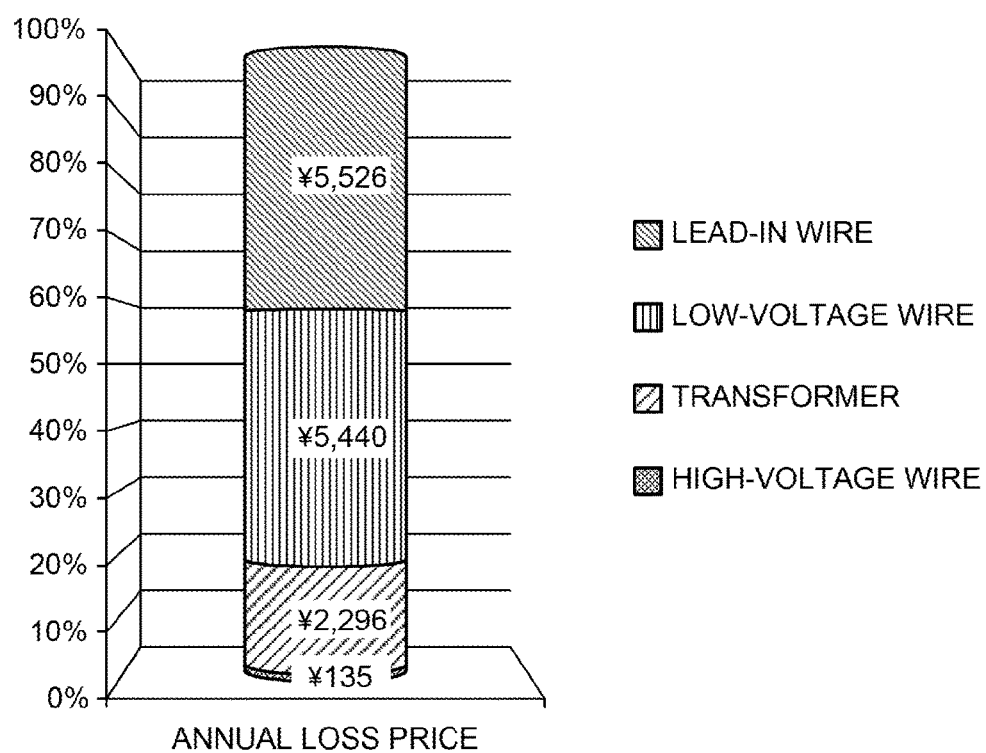
FIG. 25 is an example graph of a loss price in each predetermined period in units of the types of the distribution facilities.

FIG. 25 is an example graph of the loss price in each predetermined period in units of the types of the distribution facilities. The example in FIG. 25 illustrates the loss price in each predetermined period in the high-voltage wires, the transformers, the low-voltage wires, and the lead-in wires. This makes it possible to grasp the loss price due to the amount of power loss in units of the types of the distribution facilities.

A control unit 19 includes a simulation unit 19h.

The display control unit 19g displays a simulation instruction screen used to instruct execution of a simulation when a distribution facility is replaced on the client terminal 30. The simulation instruction screen enables specification of a distribution facility to be replaced based on the facility performance information 26.

When replacement of a distribution facility is specified on the simulation instruction screen, the simulation unit 19h runs various types of simulations relating to the distribution system with the specified distribution facility. When replacement of a distribution facility forming a node or a branch stored in a current node table 17a or a current branch table 17b in distribution system information 17 is specified, for example, the simulation unit 19h runs a simulation of the replacement. An assumption is made that an instruction to replace a transformer of 30 kVA with a transformer of 10 kVA in the distribution system is issued, for example. The simulation unit 19h reads from the facility performance information 26, the performance and the unit price of the distribution facilities before and after the replacement. The simulation unit 19h reads from the facility performance information 26, the transformer capacity and the unit price of the transformer of 30 kVA and the transformer of 10 kVA. The simulation unit 19h calculates a distribution loss caused by the replacement of the distribution facility. The simulation unit 19h, for example, calculates a voltage and a load current in the distribution facility after the replacement based on: the information on voltage, load current and facility performance calculated for distribution facilities before the replacement; and the information on the facility performance of the distribution facility after the replacement. In one aspect, the simulation unit 19h calculates, when the transformer capacity of the transformer is changed, a voltage and a load current in the transformer after the replacement. The simulation unit 19h calculates the amount of power loss in each distribution facility based on the load current of each distribution facility.

The simulation unit 19h derives a change in the loss price based on a change in the amount of power loss in the replacement of the distribution facility. The simulation unit 19h, for example, derives a change in the loss price per unit time after the replacement based on the amount of power loss before the replacement, thereby deriving a change in the loss price per year.

FIG. 26 is a diagram for explaining a change in the loss price caused by the replacement of the distribution facility. As illustrated in FIG. 26, the transformer of 30 kVA has an amount of power loss per unit time of 0.349 kWh and a loss price per unit time of 6 yen. In this case, the amount of power loss in a year is 127.543 kWh and the loss price is 2,296 yen. By contrast, the transformer of 10 kVA has an amount of power loss per unit time of 1.064 kWh and a loss price per unit time of 19 yen. In this case, the amount of power loss in a year is 388.213 kWh and the loss price is 6,988 yen.

The difference in the amount of power loss per unit time between the transformer of 10 kVA and the transformer of 30 kVA is 0.715 kWh, and the difference in the loss price per unit time therebetween is 13 yen. The difference in the amount of power loss between the transformer of 10 kVA and the transformer of 30 kVA in a year is 261 kWh, and the difference in the loss price therebetween in a year is 4,692 yen.

The simulation unit 19h further calculates the difference in the unit price in replacement of the transformer of 10 kVA with the transformer of 30 kVA. FIG. 27 is a diagram for explaining a change in the price caused by replacement of the distribution facility. Assuming that the number of transformers is three as illustrated in FIG. 14 and FIG. 15, the transformers of 30 kVA cost 480,000 yen (=160,000 yen×3) as illustrated in FIG. 27. By contrast, the transformers of 10 kVA cost 360,000 yen (=120,000 yen×3). In this case, the difference in the price between the transformer of 30 kVA and the transformer of 10 kVA is 120,000 yen.

The simulation unit 19h accumulates the loss price per year, thereby running a simulation of how many years it takes for the accumulated loss price no reach the difference in the unit price caused by the replacement of the distribution facility. FIG. 28 is an example diagram of comparison of the accumulated value of the loss price per year with the difference in the unit price. The example in FIG. 28 indicates that accumulation of a loss price per year of 4,692 for 26 years exceeds 120,000 yen. While the comparison is made between the difference and the loss price per year, the comparison may be made with a loss price in a desired period, such as per month and per day.

Figure 29:
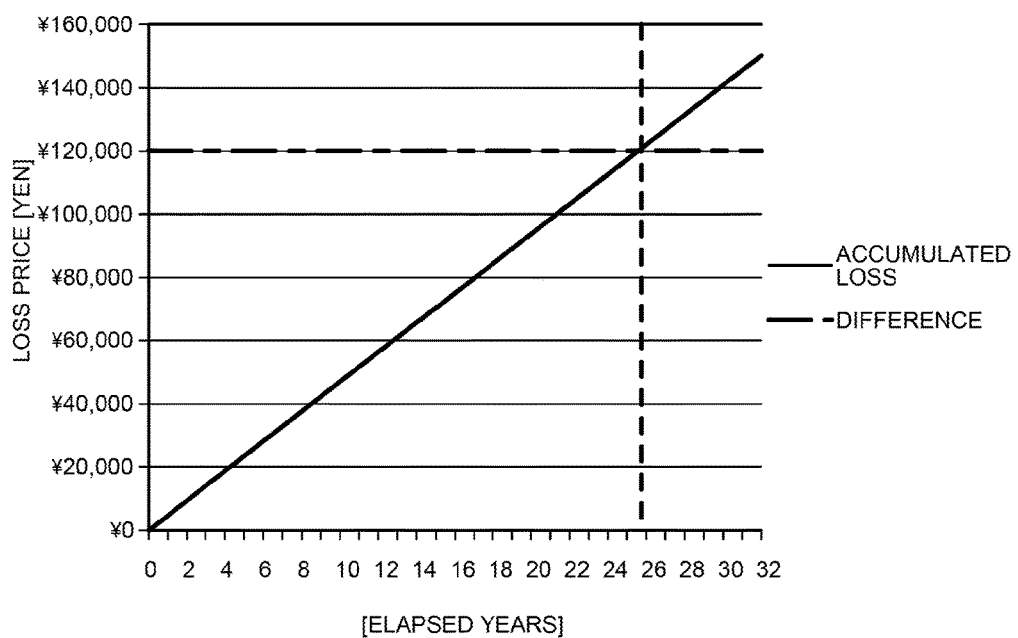
FIG. 29 illustrates an example of display of a result of simulation.

The display control unit 19g displays information on the result of the simulation run by the simulation unit 19h on the client terminal 30. FIG. 29 illustrates an example of display of the result of the simulation. As illustrated in FIG. 29, for example, the display control unit 19g displays the accumulated value of the loss price per year and the difference in the unit price on a graph. This makes it possible to grasp how much use of the distribution facility leads to a reduction in the cost. The example in FIG. 29 indicates that the transformer of 30 kVA has a smaller cost in the use for 26 years or longer, whereas the transformer of 10 kVA has a smaller cost in the use for shorter than 26 years, for example.

Advantageous Effects of the Second Embodiment

As described above, the loss calculating device 10 according to the present embodiment converts the amount of power loss into an amount of money based on the unit price information 25. This makes it possible to grasp the amount of power loss as an amount of money.

[c] Third Embodiment

While the explanations have been made of the embodiments of the disclosed device, the present invention may be embodied as various difference aspects besides the embodiments above. The following describes other embodiments included in the present invention.

Distribution and Integration

The components of each device illustrated in the drawings are not necessarily physically configured as illustrated. In other words, the specific aspects of distribution and integration of each device are not limited to those illustrated in the drawings. The whole or a part of each device may be distributed or integrated functionally or physically in desired units depending on various types of loads and usage, for example. The retrieval unit 19a, the associating unit 19b, the acquiring unit 19c, the first calculating unit 19d, the second calculating unit 19e, the totalizing unit 19f, the display control unit 19g, and the simulation unit 19h may be connected to the loss calculating device 10 as external devices via a network, for example. Alternatively, the retrieval unit 19a, the associating unit 19b, the acquiring unit 19c, the first calculating unit 19d, the second calculating unit 19e, the totalizing unit 19f, the display control unit 19g, and the simulation unit 19h may be included in respective different devices. In this case, the respective devices are connected via a network to cooperate with one another, thereby carrying out the functions of the loss calculating device 10.

Loss Calculation Program

The various types of processing described in the embodiments can be performed by a computer, such as a personal computer and a workstation, executing a computer program prepared in advance. The following describes an example of a computer that executes a loss calculation program having functions similar to those of the embodiments with reference to FIG. 30.

Figure 30:
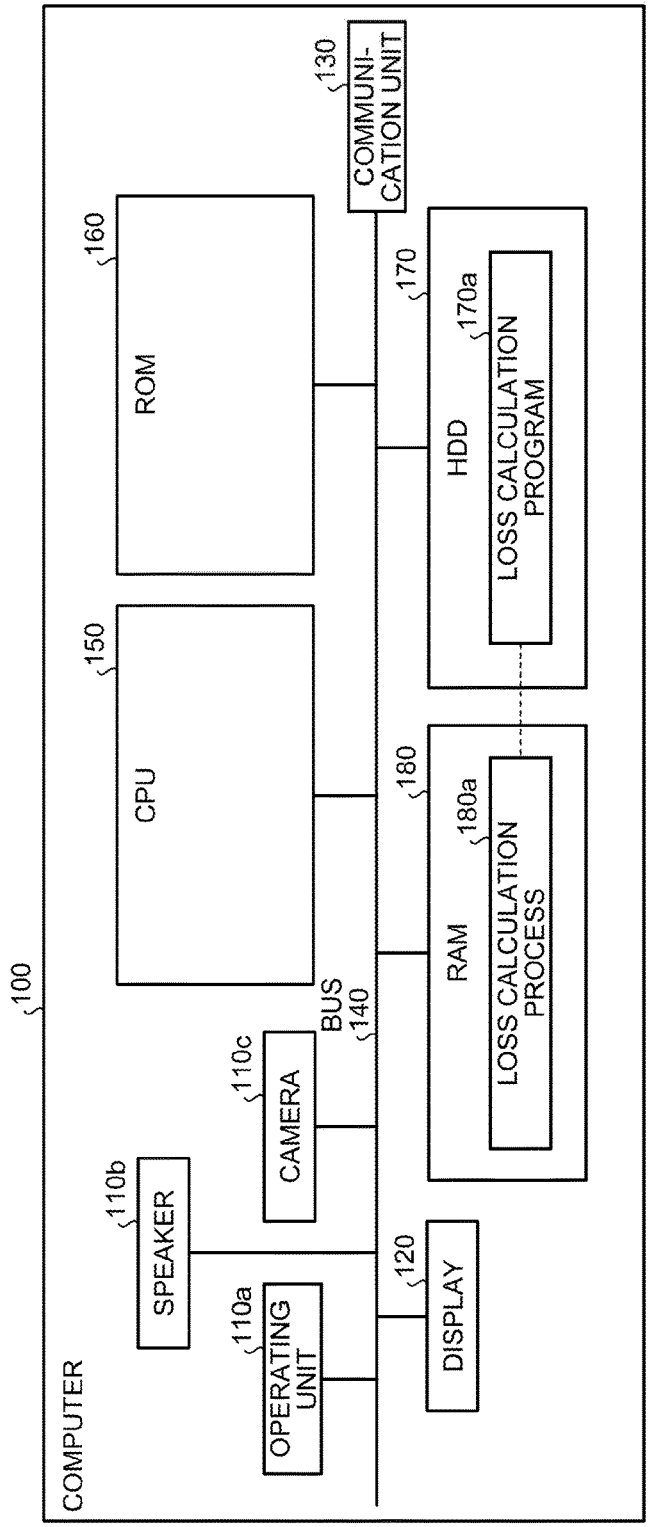
FIG. 30 is an example block diagram for explaining a computer that executes a loss calculation program according to the first embodiment to a third embodiment of the present invention.

FIG. 30 is an example block diagram for explaining the computer that executes the loss calculation program according to the first to the third embodiments. As illustrated in FIG. 30, a computer 100 includes an operating unit 110a, a speaker 110b, a camera 110c, a display 120, and a communication unit 130. The computer 100 further includes a CPU 150, a ROM 160, a hard disk drive (HDD) 170, and a RAM 180. The units 110 to 180 are connected to one another via a bus 140.

As illustrated in FIG. 30, the HDD 170 stores therein a loss calculation program 170a in advance. The loss calculation program 170a carries out functions similar to those of the retrieval unit 19a, the associating unit 19b, the acquiring unit 19c, the first calculating unit 19d, the second calculating unit 19e, the totalizing unit 19f, the display control unit 19g, and the simulation unit 19h described in the first and the second embodiments. The loss calculation program 170a may be integrated or distributed as needed. In other words, all the data stored in the HDD 170 are not necessarily stored in the HDD 170. Data required for the processing alone may be stored in the HDD 170.

The CPU 150 reads the loss calculation program 170a from the HDD 170 and loads it on the RAM 180. This causes the loss calculation program 170a to function as a loss calculation process 180a as illustrated in FIG. 30. The loss calculation process 180a loads various types of data read from the HDD 170 on an area allocated thereto on the RAM 180 as needed. The loss calculation process 180a performs various types of processing based on the loaded various types of data. The loss calculation process 180a includes the processing performed by the retrieval unit 19a, the associating unit 19b, the acquiring unit 19c, the first calculating unit 19d, the second calculating unit 19e, the totalizing unit 19f, and the display control unit 19g, and the simulation unit 19h illustrated in FIG. 1 and FIG. 22, specifically, the processing illustrated in FIG. 19 to FIG. 21, for example. All the processing units virtually provided on the CPU 150 do not necessarily operate on the CPU 150. A processing unit required for the processing alone may be virtually provided.

The loss calculation program 170a is not necessarily stored in the HDD 170 or the ROM 160 in advance. Each computer program may be stored in a "portable physical medium" inserted into the computer 100, such as a flexible disk (what is called an FD), a compact disc read only memory (CD-ROM), a digital versatile disc (DVD), a magneto-optical disc, and an integrated circuit (IC) card. The computer 100 may acquire each computer program from the portable physical medium to execute the computer program. Alternatively, each computer program may be stored in another computer or a server connected to the computer 100 via a public line, the Internet, a LAN, a wide area network (WAN), or the like. The computer 100 may acquire each computer program from these devices to execute the computer program.

The present invention can grasp a distribution loss of each distribution facility.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program for causing a computer to execute a process, the process comprising:
   calculating a load current of each distribution facility based on a sending voltage in power source facilities and load information on a power consumption facility in an electrical circuit including the power source facility, the distribution facilities, and the power consumption facilities connected to one another to form the electrical circuit;
   calculating an amount of power loss in each distribution facility based on the calculated load current of each distribution facility;
   receiving a specification to change performance of any one of the distribution facilities in the electrical circuit based on facility performance information including a unit price of performance of the distribution facility;
   when specified distribution facility is changed for specified performance, calculating amount of power loss of the specified distribution facility before and after the change of the performance and converting the difference of calculated amount of power loss of the specified distribution facility between before and after the change of the performance into an amount of money using the unit price of performance of the distribution facility; and
   displaying amount of money converted by the converting in total and difference of the unit price of the performance between before and after the change of the performance.

2. The non-transitory computer-readable recording medium according to claim 1, wherein
   the load information on the power consumption facilities are acquired every predetermined period;
   the calculating of the load current includes calculating the load current of each distribution facility in each predetermined period is calculated based on the sending voltage in the power source facility and the load information on the power consumption facilities acquired every predetermined period; and the calculating of the amount of power loss includes calculating the amount of power loss in each predetermined period in each distribution facility is calculated using the load current in each predetermined period calculated for each distribution facility.

3. The non-transitory computer-readable recording medium according to claim 2, wherein the process further comprises:

totalizing the amount of power loss in each predetermined period calculated for each distribution facility in units of the predetermined period and a type of the distribution facility; and displaying the amount of power loss totalized in units of the predetermined period and the type of the distribution facility.

4. The non-transitory computer-readable recording medium according to claim 2, wherein the process further comprises:

calculating the sum of the amount of power loss in each predetermined period calculated for each distribution facility in units of a type of the distribution facility; and displaying the calculated sum of the amount of power loss in units of the type of the distribution facility.

5. The non-transitory computer-readable recording medium according to claim 1, wherein the process further comprises:

converting the amount of power loss into an amount of money based on unit price information indicating a unit price of electric power.

6. A loss calculation method executed by a computer, the method comprising:

calculating a load current of each distribution facility based on a sending voltage in power source facilities and load information on a power consumption facility in an electrical circuit including the power source facility, the distribution facilities, and the power consumption facilities connected to one another to form the electrical circuit;

calculating an amount of power loss in each distribution facility based on the calculated load current of each distribution facility;

receiving a specification to change performance of any one of the distribution facilities in the electrical circuit based on facility performance information storing a unit price of performance of the distribution facility;

when specified distribution facility is changed for specified performance, calculating amount of power loss of the specified distribution facility before and after the change of the performance and converting the difference of calculated amount of power loss of the specified distribution facility between before and after the change of the performance into an amount of money using the unit price of performance of the distribution facility; and displaying amount of money converted by the converting in total and difference of the unit price of the performance between before and after the change of the performance.

7. A loss calculating device comprising:

a first calculating unit that calculates a load current of each distribution facility based on a sending voltage in power source facilities and load information on a power consumption facility in an electrical circuit including the power source facility, the distribution facilities, and the power consumption facilities connected to one another to form the electrical circuit, a second calculating unit that calculates an amount of power loss in each distribution facility based on the calculated load current of each distribution facility;

a receiving unit that receives a specification to change performance of any one of the distribution facilities in the electrical circuit based on facility performance information storing a unit price of performance of the distribution facility;

a totalizing unit that when specified distribution facility is changed for specified performance, calculates amount of power loss of the specified distribution facility before and after the change of the performance and converts the difference of calculated amount of power loss of the specified distribution facility between before and after the change of the performance into an amount of money using the unit price of performance of the distribution facility; and a display control unit that controls to display amount of money converted by the totalizing unit in total and difference of the unit price of the performance between before and after the change of the performance.

* * * * *